(12) United States Patent
Kishimoto et al.

(10) Patent No.: US 6,314,083 B1
(45) Date of Patent: Nov. 6, 2001

(54) FREQUENCY CONTROL DEVICE AND METHOD FOR FREQUENCY SYNCHRONIZATION WITH MULTIPLEX SIGNAL BY OFDM, RECEIVING DEVICE, AND COMMUNICATION DEVICE

(75) Inventors: Takurou Kishimoto, Kuroiso; Tadahiko Sakamoto, Kawasaki, both of (JP)

(73) Assignee: Nippon Columbia Co., Ltd., Tokyo (JP)

( * ) Notice: Subject to any disclaimer, the term of this patent is extended or adjusted under 35 U.S.C. 154(b) by 0 days.

(21) Appl. No.: 09/053,740

(22) Filed: Apr. 2, 1998

(30) Foreign Application Priority Data

Apr. 4, 1997 (JP) .................................................. 9-087027

(51) Int. Cl.[7] .................................................. H04J 11/00
(52) U.S. Cl. ........................................... 370/210; 375/344
(58) Field of Search .................................. 370/210, 206, 370/208, 458, 204, 205, 203, 336, 337, 345, 347, 442; 375/295, 297, 298, 303, 308, 316, 317, 318, 320, 329, 344, 345, 350

(56) References Cited

U.S. PATENT DOCUMENTS

| | | | |
|---|---|---|---|
| 5,500,878 | * | 3/1996 | Iwasaki .................................. 375/344 |
| 5,594,754 | * | 1/1997 | Dohi et al. ............................. 375/148 |
| 5,694,389 | * | 12/1997 | Seki et al. ............................. 370/208 |
| 5,771,224 | * | 6/1998 | Seki et al. ............................. 370/206 |
| 5,774,450 | * | 6/1998 | Harada et al. ......................... 370/206 |
| 5,808,463 | * | 9/1998 | Nagano ............................. 324/76.21 |
| 6,009,073 | * | 12/1999 | Kaneko ................................ 370/203 |
| 6,038,275 | * | 3/2000 | Taura et al. ........................... 375/371 |
| 6,159,751 | * | 1/2001 | Shirakata et al. ..................... 320/480 |

* cited by examiner

Primary Examiner—Douglas Olms
Assistant Examiner—Phirin Sam
(74) Attorney, Agent, or Firm—Dickstein Shapiro Morin & Oshinsky LLP

(57) ABSTRACT

The present invention provides a frequency control device for following frequency deviation of OFDM (Orthogonal Frequency Division Multiplexing).

On metrics obtained by discrete Fourier transform by a discrete Fourier transform section 1200, calculation is performed to decide which direction, upward or downward, a center of the energy distribution of the obtained metrics deviates from a theoretical center of frequency, to obtain a frequency difference, and an AFC signal in accordance with the frequency difference is generated in the control signal generating section 1350.

19 Claims, 14 Drawing Sheets

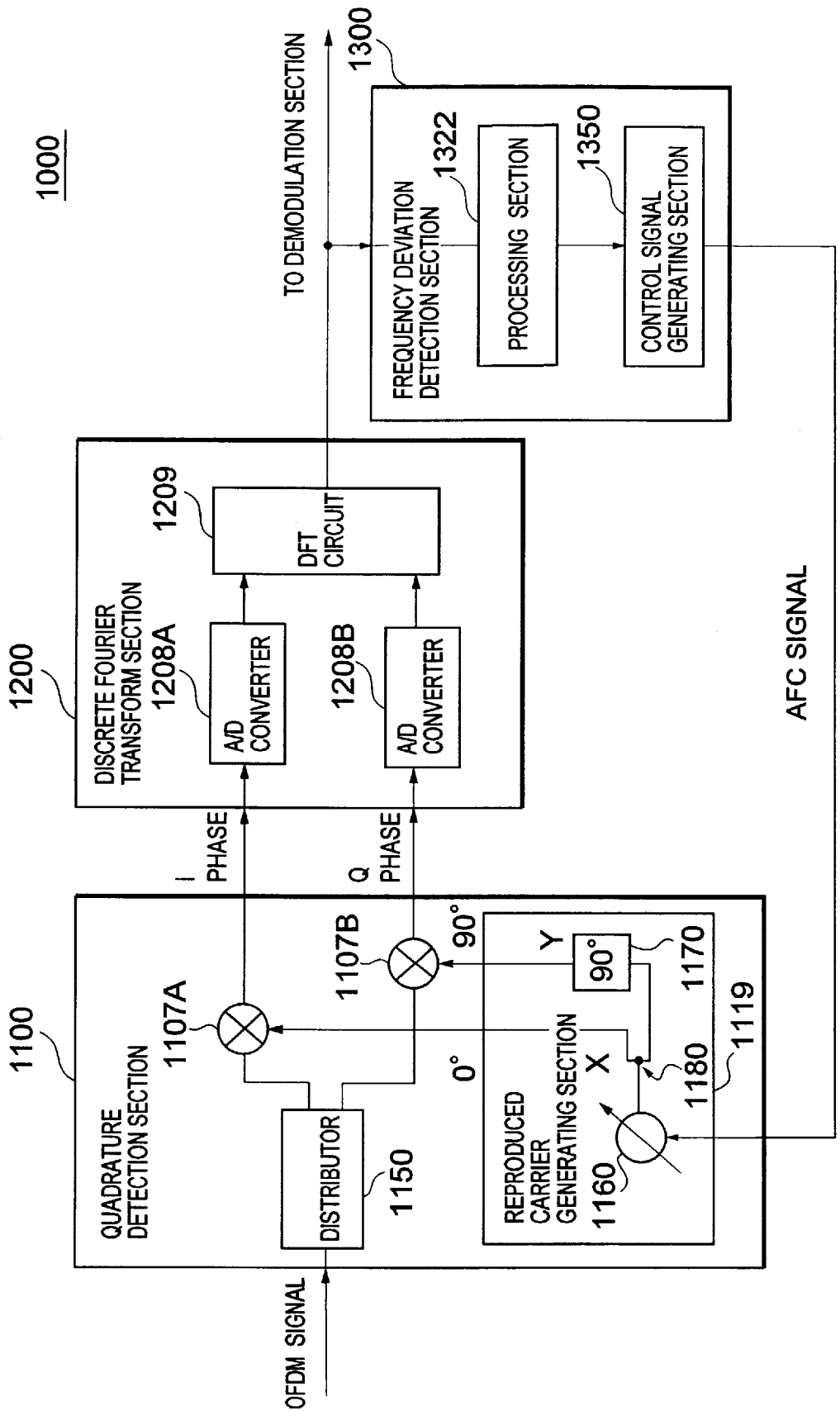

NO FREQUENCY SHIFT

WL=WH

WHEN FREQUENCY SHIFT EXISTS (WL − WH) / W t [SUMMATION OF SPECTRUM POWER]

NO FREQUENCY SHIFT

POWER Pi OF CARRIER FOR EFFECTIVE METRICS

9dB

THEORETICALLY, POWER Pi = 0
FOR CARRIER OF CENTRAL FREQUENCY.
POWER BECOMES MINIMUM
FOR 1024-TH SAMPLING POINT.

WHEN FREQUENCY SHIFT EXISTS

9dB

POWER OF CARRIER IS MINIMUM FOR
1022-TH SAMPLING POINT.
(FREQUENCY SHIFT) =
(FREQUENCY OF 1024-TH SAMPLING POINT)
- (FREQUENCY OF 1022-TH SAMPLING POINT)

FIG.9

DAB MODE i   (ONLY 1~16 ARE EXTRACTED FROM CARRIER NUMBERS −786~ +786)

| CARRIER NUMBER | TRANSMITTING PHASE | PHASE DIFFERENCE FROM LOWER CARRIER |
|---|---|---|
| i | $\theta i$ | $\psi$ |
| 1 | $0.5\pi$ | -- |
| 2 | $1.5\pi$ | $1\pi$ |
| 3 | $0.5\pi$ | $1\pi$ |
| 4 | $0.5\pi$ | 0 |
| 5 | $0.5\pi$ | 0 |
| 6 | $0.5\pi$ | 0 |
| 7 | $1.5\pi$ | $0.5\pi$ |
| 8 | $1.5\pi$ | 0 |
| 9 | $1.5\pi$ | $0.5\pi$ |
| 10 | $1.5\pi$ | $1\pi$ |
| 11 | $0.5\pi$ | 0 |
| 12 | $0.5\pi$ | 0 |
| 13 | $1.5\pi$ | $1\pi$ |
| 14 | $1.5\pi$ | $0\pi$ |
| 15 | $0\pi$ | $1.5\pi$ |
| 16 | $1\pi$ | $0\pi$ |

FREQUENCY CONTROL DEVICE AND METHOD FOR FREQUENCY SYNCHRONIZATION WITH MULTIPLEX SIGNAL BY OFDM, RECEIVING DEVICE, AND COMMUNICATION DEVICE

BACKGROUND OF THE INVENTION

1. Field of the Invention

The present invention relates to a frequency control device and method for frequency synchronization with a multiplex signal using OFDM (Orthogonal Frequency Division Multiplexing), a receiving device, and a communication device, and in particular to a frequency control device and method, receiving device, and communication device which are suitable for frequency synchronization with a multiplex signal having deviation not less than half a sub-carrier interval.

2. Description of Related Art

As a modulation system in digital communications, the OFDM system has found extensive practical use.

As an example of systems employing OFDM, there can be listed the EUREKA-147 SYSTEM, which is generally called DAB (Digital Audio Broadcasting), the EURELA-147 DAB System, etc. In the following, we will use the "EUREKA-147 DAB System". In November, 1994, ITU-R (International Telecommunication Union-Radio communication Sector) admitted EUREKA-147 DAB System as System-A, and it has become an international standard. This standard is issued as "ETS 300401".

In OFDM systems, data are multiplexed by dividing them onto a plurality of sub-carriers which are quadrate to one another. A baseband frequency of each sub-carrier is selected to be an integer multiple of a certain fundamental frequency. Assuming that one cycle of the fundamental frequency is a significant symbol duration, a product of sub-carriers that are different from each other is 0 when integrated in the significant symbol interval. In that case, it is said that these sub-carriers are quadrate.

In OFDM systems, when differences arise in frequency between sending and receiving sides, orthogonality to the other sub-carriers cannot be maintained at the time of demodulating. Owing to interference, this becomes the cause of errors in the demodulated data. As causes of the above-described frequency difference, there may be listed, for example, error and variation of an oscillation frequency of a reference oscillator on each of the sending and receiving sides, Doppler shift due to relative movement between the sending and receiving sides, and the like.

To obtain demodulated data with a smaller number of errors even when frequency difference is produced, frequency synchronization systems have been studied. For example, such a frequency synchronization system is described in "A New Frequency Synchronization Technique for OFDM Demodulators Using Guard Intervals", (ITEJ (Institute of Television Engineers of Japan) Technical Report, Vol. 19, No. 38, pp. 13–18). This frequency synchronization system utilizes the guard interval in which a signal waveform in the significant symbol duration is repeated cyclically.

Namely, a received signal is translated into the baseband through a quadrature detection circuit, and each carrier component is then demodulated by a FFT (Fast Fourier Transform) circuit. In FIG. 14, (1) illustrates in-phase axis output of the quadrature detector. Here, an n-th OFDM symbol consists of a guard part Gn (sample number: Ng) and a significant symbol part Sn (sample number: Ns), and signal Gn in the guard interval is a copy from a part Gn' of the significant symbol. In FIG. 14 (2), the signal shown in FIG. 14 (1) is delayed by the significant symbol duration. FIG. 14 (3) is a result of obtaining correlation between the two signals (1) and (2), by multiplying the signals (1) and (2), and then calculating a moving average in the width of the guard interval (Ng samples). As shown in FIG. 14 (3), since Gn and Gn' have the same signal waveform, the correlation output has peaks at boundaries of symbols.

Assuming that the peak value for the correlation between the in-phase axis data and the in-phase axis data delayed by the significant symbol duration is Sii, and that a peak value for correlation between the in-phase axis data and quadrature axis data delayed by the significant symbol duration is Siq, frequency error δ is obtained by the following equation:

$$\delta = \arctan\left(\frac{Siq}{Sii}\right) \qquad (1)$$

SUMMARY OF THE INVENTION

According to the above-described method of obtaining frequency error using the arc tangent function, a relation between frequency offset normalized with the sub-carrier interval and the frequency error δ0 obtained as described above is so periodic that one interval is equal to the sub-carrier interval, as shown in FIG. 15. Accordingly, it is not possible to differentiate an interval to which a frequency offset corresponding to a frequency error δ belongs. For example, as shown in FIG. 15, when a frequency error δ1 is obtained, the point B and point C, in addition to the point A, correspond to the frequency error δ1. Thus, even if the true normalized frequency offset is $O_A$, it cannot be differentiated from the offsets $O_B$, $O_C$, etc. Thus, when there exists a deviation of more than or equal to half the sub-carrier interval, it is difficult to specify its frequency offset, and it may erroneously reverse the direction of the offset.

In OFDM, however, an interval between sub-carriers is set to be narrow, and it is difficult to hold down a frequency difference to less than half of the sub-carrier interval.

For example, Mode I of EUREKA-147 DAB System defines the central frequency as 230 MHz and the sub-carrier interval as 1 kHz. Namely, the frequency corresponding to half the sub-carrier interval is 500 Hz, which means a frequency accuracy of about 2.2 PPM. However, it is not easy to hold down a frequency difference between a transmitting frequency and a receiving frequency to less than 2.2 PPM. Attaining this accuracy is inevitably accompanied by increased cost of an oscillator, and is not practical.

Further, when relative distance between transmitting and receiving sides is changed as in the case of, for example, receiving a broadcast using a receiver mounted on a moving object, frequency deviation (Doppler shift) arises due to the Doppler effect. Thus, unfavorably, relative speed between the transmitting and receiving sides is so restricted that the above-described Doppler shift is within half the sub-carrier interval.

Further, the above-described method can be applied only to an OFDM signal which includes guard intervals. When a guard interval does not exist, it is difficult to detect the frequency deviation.

Thus, a first object of the present invention is to provide a frequency control device which can identify an extent of frequency deviation of an OFDM signal and can perform frequency synchronization, even when the frequency deviation is more than or equal to half a sub-carrier interval.

A second object of the present invention is to provide a frequency control device which can detect frequency deviation of an OFDM signal and can perform frequency synchronization, even when the OFDM signal does not include a guard interval.

Further, a third object of the present invention is to provide a receiving device and a communication device which are suitable in the case where relative distance between transmitting and receiving sides is changed and Doppler shift arises that is more than half a sub-carrier interval.

To attain the above-described first and second objects, a first mode of the present invention provides a frequency control device for frequency synchronization with a multiplex signal produced by orthogonal frequency division multiplexing into a plurality of sub-carriers, comprising:

quadrature detection means for performing quadrature detection on said multiplex signal to obtain a first detection axis signal and a second detection axis signal, which are quadrate to each other;

discrete Fourier transform means for obtaining a plurality of metrics distributed in a frequency domain, by sampling respective time axis waveforms of the two detection axis signals at a predetermined sampling frequency, and by performing discrete Fourier transform on thus-sampled data;

operation control means for generating frequency change instructions in accordance with difference between distribution of the metrics obtained by the discrete Fourier transform means and a predetermined distribution of metrics; and frequency changing means for changing the frequency of a signal inputted into said discrete Fourier transform means in accordance with the instructions generated by the operation control means.

A second mode of the present invention provides a frequency control device for frequency synchronization with a multiplex signal, which is produced by orthogonal frequency division multiplexing into a plurality of sub-carriers and has a reference symbol duration for transmitting a reference phase used in differential demodulation of each sub-carrier, comprising:

quadrature detection means for performing quadrature detection on the multiplex signal using reproduced carriers, to obtain a first detection axis signal and a second detection axis signal, which are quadrate to each other;

discrete Fourier transform means for obtaining a plurality of metrics distributed in a frequency domain, by sampling respective time axis waveforms of the two detection axis signals at a predetermined sampling frequency, and by performing discrete Fourier transform on thus-sampled data;

operation control means for generating frequency change instructions in accordance with a difference between a series of phases of the metrics obtained by the discrete Fourier transform means and a predetermined series of phases; and frequency changing means for changing the frequency of a signal inputted into the discrete Fourier transform means in accordance with the instructions generated by the operation control means, and the operation control means stores in advance, for at least some of the sub-carriers out of the plurality of sub-carriers, a series of phase differences indicating phase difference between a reference phase of each sub-carrier and a reference phase of a next sub-carrier, and, when the multiplex signal is received in the reference symbol duration, obtains, for metrics in the reference symbol duration, phase differences between each metric and respective next metric, and gives instructions to the frequency changing means to change the frequency that the series of phases stored in advance so as to coincide with at least some of a series of phase differences obtained.

A third mode of the present invention provides a frequency control device for frequency synchronization with a multiplex signal produced by orthogonal frequency division multiplexing into a plurality of sub-carriers, comprising:

transform means for transforming time axis waveforms of received multiplex signal into a frequency domain;

comparing means for comparing a frequency of a center of a spectral distribution obtained by the transformation into the frequency domain with a predetermined reference frequency; and changing means for changing a frequency of the multiplex signal before being inputted into said transform means so that a difference between the frequency of the center of the spectral distribution and the reference frequency becomes smaller.

A fourth mode of the present invention provides a method of frequency control for frequency synchronization with a multiplex signal produced by orthogonal frequency division multiplexing into a plurality of sub-carriers, comprising the steps of:

transforming time axis waveforms of a received multiplex signal into a frequency domain;

comparing a frequency of a center of a spectral distribution obtained by the transformation into the frequency domain with a predetermined reference frequency; and changing a frequency of the multiplex signal before being transformed into the frequency domain so that a difference between the frequency of the center of the spectral distribution and the reference frequency becomes smaller.

To attain the above-described third object, fifth mode of the present invention provides a receiving device for receiving multiplex signal produced by orthogonal frequency division multiplexing, comprising:

a band-pass filter section for receiving a high frequency signal containing the multiplex signal, and for selecting a part in a predetermined frequency band from the received high frequency signal;

a frequency control section for quadrature detection of the selected signal using reproduced carriers, for performing discrete Fourier transform on the detected signal, and for controlling frequencies of the reproduced carriers to perform frequency synchronization;

a demodulation section for demodulating said data processed by the discrete Fourier transform; and an output section for outputting the demodulated signal, and the frequency control part is constituted using the frequency control device in one of the above-described first and second modes.

A sixth mode of the present invention provides a communication device for communication using a multiplex signal produced by orthogonal frequency division multiplexing, comprising:

a transmitting section for performing orthogonal frequency division multiplexing modulation on a carrier, using data indicated by an inputted signal, and for transmitting the multiplex signal obtained; and a receiving section for detecting modulated data, by performing orthogonal frequency division multiplexing demodulation on a received signal, and for outputting a signal indicated by the modulated data; and the receiving part is constituted using the receiving device of the above-described fifth mode.

BRIEF DESCRIPTION OF THE DRAWINGS

FIG. 1 is a block diagram showing a frequency control device according to the present invention;

FIG. 2A is a waveform diagram showing structures in the time domain, and

FIG. 2B is a spectrum diagram showing a structure in the frequency domain;

FIG. 3A shows distribution when there is no frequency difference, and

FIG. 3B shows distribution when there is a frequency difference;

FIG. 5A shows distribution when there is no frequency difference, and

FIG. 5B shows distribution when there is a frequency difference;

FIG. 7A shows distribution when there is no frequency difference, and

FIG. 7B shows distribution when there is a frequency difference;

FIG. 9 is an explanatory view showing a list of phases defined by Mode I of DAB;

DETAILED DESCRIPTION OF THE PREFERRED EMBODIMENTS

Figure 2A:
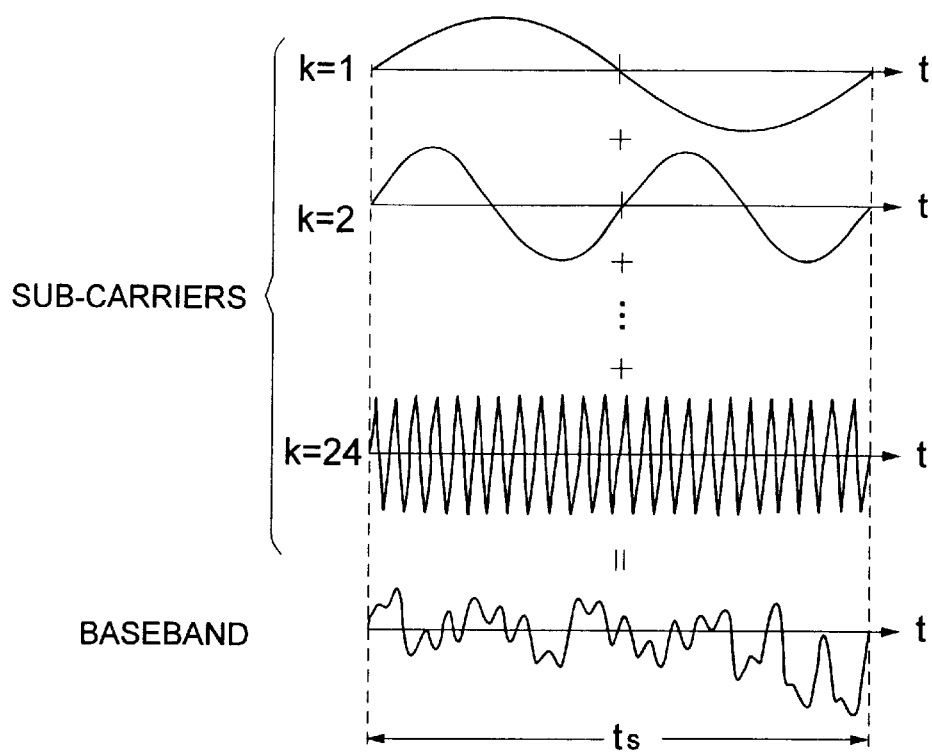
FIGS. 2A and 2B are explanatory views of OFDM signal.

Now, embodiments of the present invention will be described referring to the drawings.

First, a first embodiment of the present invention will be described referring to FIG. 1. As shown in FIG. 1, a frequency control device 1000 comprises a quadrature detection section 1100, a discrete Fourier transform section 1200, and a frequency deviation detection section 1300.

The above-described quadrature detection section 1100 receives an OFDM signal and obtains two detection axis signals, which are quadrate to each other, using reproduced carriers. As the two detection axes, there may be selected an in-phase axis (I-phase axis) which is in-phase with the received signal, and a quadrate axis (Q-phase axis) which is quadrate to the received signal. The two detection axes, however, are not limited to these phases, and other phases may be used as long as they are in quadrature relation to each other. For example, a detection axis with a phase of +45° and a detection axis with a phase of −45° may be selected.

The quadrature detection section 1100 may comprise, for example, a distributor 1150 for distributing the received signal into two signals, a reproduced carrier generating section 1119 for generating two reproduced carriers X, Y having a phase difference of 90° between them, and two multipliers 1107A, 1107B for multiplying the above-described two distributed signals by the above-described reproduced carrier signals X and Y, respectively.

The reproduced carrier generating section 1119 may comprise, for example, a frequency-variable oscillator 1160 which can vary its oscillation frequency, a branching circuit 1180 for distributing the generated signal into two signals, and a phase shifter 1170 for imparting a phase delay of 90° to one of the distributed signals. Using the thus-constituted reproduced carrier generating section 1119, it is possible to generate reproduced carriers. Further, the above-described frequency-variable oscillator 1160 can vary in its oscillation frequency in accordance with an AFC (automatic frequency control) signal given from the frequency deviation detection section 1300.

The discrete Fourier transform section 1200 is for sampling the above-described I-phase signal and Q-phase signal at sampling points whose number is more than the number of sub-carriers included in an OFDM signal, and for processing these signals by the discrete Fourier transform. The discrete Fourier transform section 1200 may comprise, for example, two A/D (Analog to Digital) converters 1208A, 1208B, and a DFT (Discrete Fourier Transform) circuit 1209 for performing the discrete Fourier transform. As the calculation algorithm for performing the discrete Fourier transform in DFT circuit 1209, the calculation may be carried out in accordance with the equation defining DFT, or Fast Fourier Transform (FFT) may be employed. By employing FFT, the calculation of DFT can be performed at high speed. DFT circuit 1209 may be constituted, for example, by dedicated hard logic. Otherwise, DFT circuit 1209 may be constituted using a general-purpose processor provided with a program for performing a DFT process.

The frequency deviation detection section 1300 is for receiving metrics obtained in the discrete Fourier transform section 1200, for obtaining a frequency difference from the received OFDM signal, and for performing operation control for frequency synchronization to make the obtained frequency difference smaller. The frequency deviation detection section 1300 may comprise, for example, a processing section 1322 for carrying out operations to obtain the frequency difference, and a control signal generating section 1350 for generating an AFC (automatic frequency control) signal corresponding to the frequency difference obtained by the processing section 1322.

The control signal generating section 1350 may use, for example, a D/A (digital to analog) converter which generates a signal having a voltage corresponding to the processing result. Further, when a number control oscillator is employed as the reproduced carrier generating section 1119 in the above-described quadrature detection section 1100, the control signal generating section 1350 may be omitted and signal which indicates the processing result may be directly given to the reproduced carrier generating section 1119. Thus, it is possible to generate AFC signal which indicates size of variation to be made on the frequency in accordance with the processing result.

Alternatively, the size of the variation indicated by the AFC signal may be set constant, while the existence or non-existence of the variation and direction of the variation are changed in accordance with the above-described processing result. With a constant value of the variation, the control signal generating section 1350 and the reproduced carrier generating section 1119 in the quadrature detection section 1100 can have simple constructions.

Figure 13:
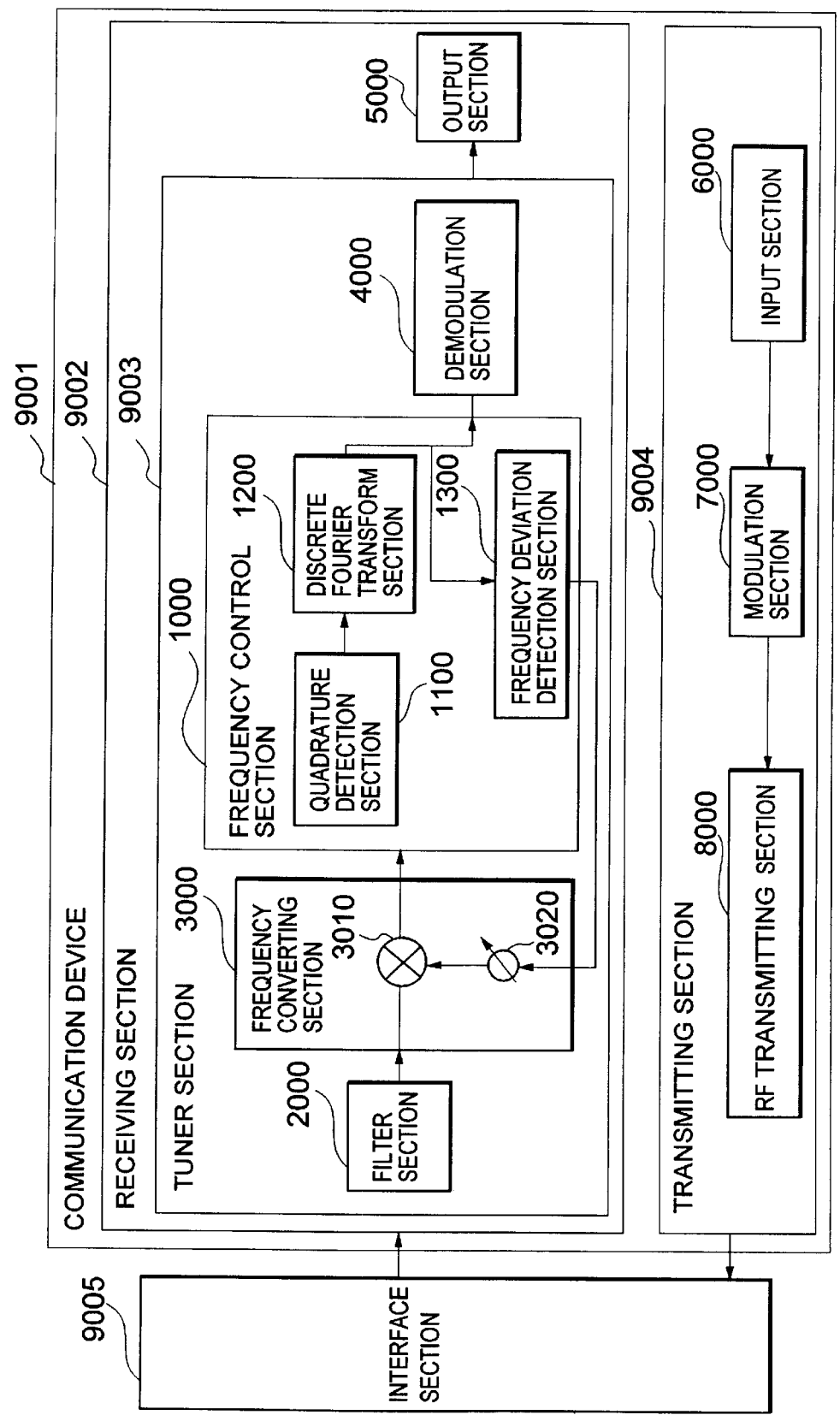
FIG. 13 is a block diagram showing another mode of the communication device according to the present invention.
Figure 14:
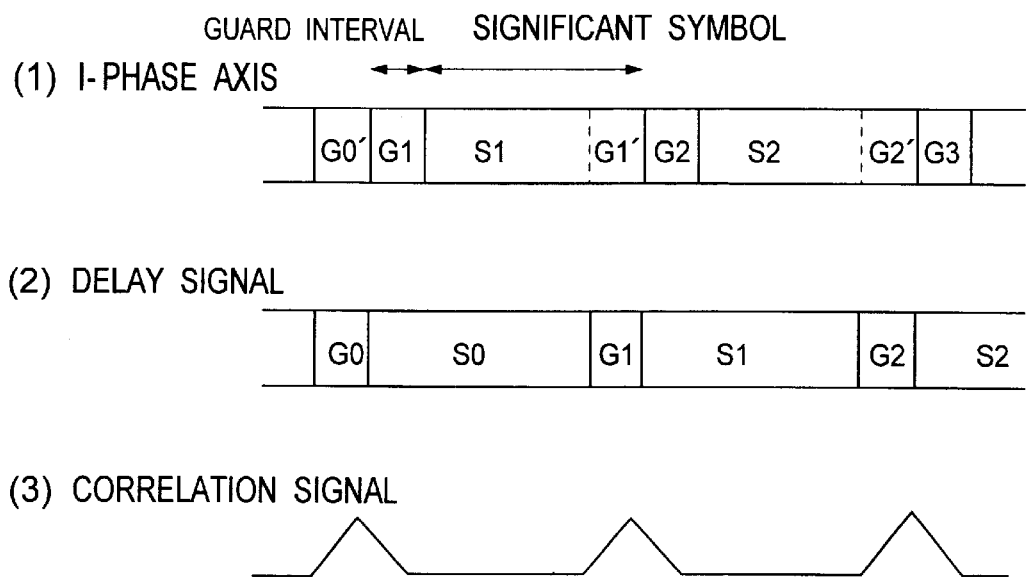
FIG. 14 is an explanatory view showing a correlation of signals used for detection of frequency difference in the conventional frequency control method.
Figure 15:
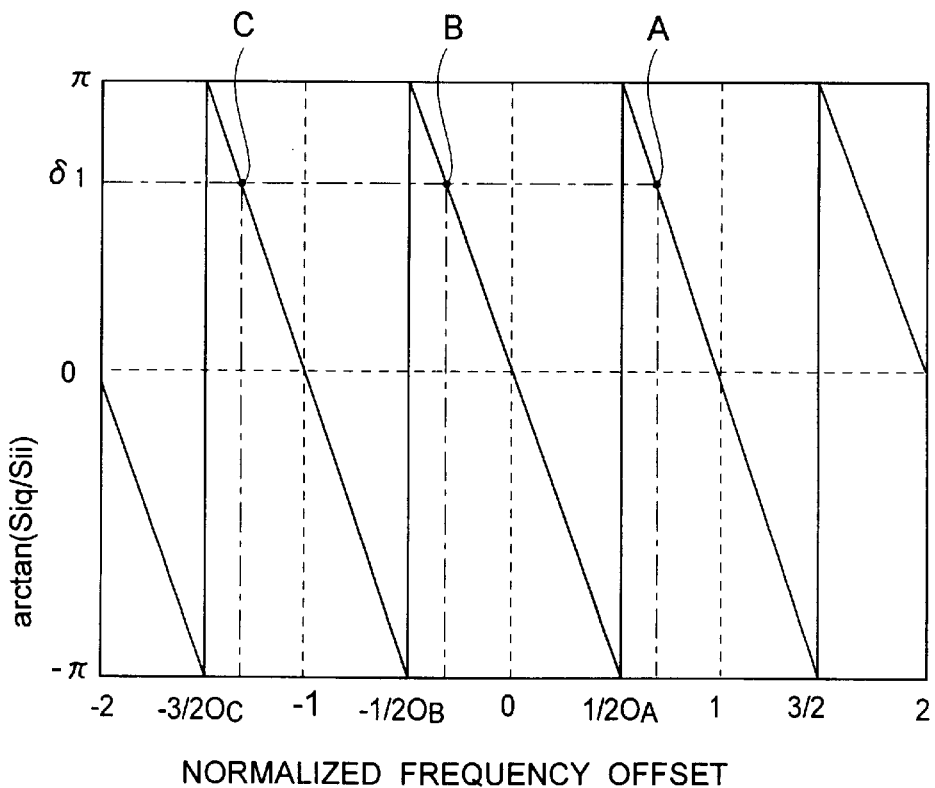
FIG. 15 is a graph showing a relation between correlation signal and frequency offset.

In the above description of the present mode of the embodiment, the frequencies of the reproduced carriers are changed in the quadrature detection section 1100. However, the mode of frequency varying is not limited to this case. For example, as shown in FIG. 13, in the case where a frequency converting section 3000 for converting the received OFDM signal to an intermediate frequency is provided in a preceding stage to the quadrature detection section 1100, an AFC signal can be given to the frequency converting section 3000 to change the extent of frequency variation carried out in the frequency converting section 3000.

Next, referring to FIGS. 1 and 2, operation of the above-constructed frequency control device will be described.

First, referring to FIG. 2, there will be described an OFDM signal given to the frequency control device.

As shown in FIG. 2A, baseband of an OFDM signal has a time-axis waveform which is a superposition of a plurality of sub-carriers having different frequencies from one another. Although FIG. 2A illustrates an OFDM signal multiplexed into 24 sub-carriers, the number of sub-carriers is not, of course limited to it.

Figure 2B:
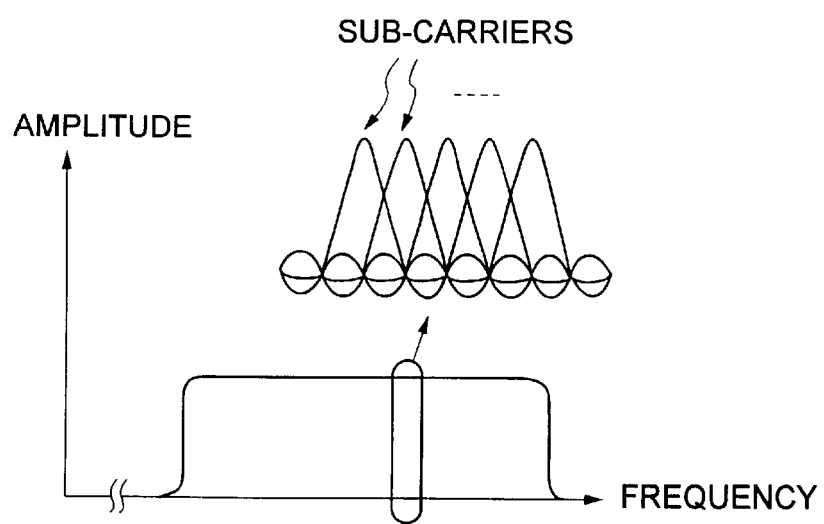

In FIG. 2B, the baseband of the above-described OFDM signal is shown by the spectrum in the frequency domain. This corresponds to Fourier transform of the time-axis waveform shown in FIG. 2A. In FIG. 2B, a plurality of sub-carriers are ranked on the frequency axis, and each sub-carrier contains sideband components due to modulation.

Next, referring to FIG. 1, operation of the frequency control device of the present embodiment will be described.

First, the quadrature detection section 1100 receives the OFDM signal and obtains an I-phase axis signal and a Q-phase axis signal which are quadrate to each other.

Then, in the discrete Fourier transform section 1200, each of the signals of the above two detection axes (I-phase axis signal and Q-phase axis signal) is sampled. In the discrete Fourier transform section 1200 of the present embodiment (See FIG. 1), the sampling is performed at sampling points which are more than the number of sub-carriers, and the calculation of the discrete Fourier transform is carried out on the sampled data.

Namely, the sampled I-phase axis data and Q-phase axis data are processed by the discrete Fourier transform as complex quantities (for example, with a sampled value of the I-phase axis signal being a real part, and with a sampled value of the Q-phase axis signal being an imaginary part). By the discrete Fourier transform, metrics (complex metrics) Z can be obtained for each of frequency slots whose number corresponds to the number Ns of the sampling points. Among the Ns metrics Z, there are included effective metrics corresponding to the number $N_C$ of sub-carriers, as well as ineffective metrics corresponding to the number Nos (=$N_S$–$N_C$) by which the number of the sampling points exceeds the number of the sub-carriers. The ineffective metrics are components due to noise, and due to leaks from the respective sub-carriers, or the like. As a metrics distribution obtained from the result of the discrete Fourier transform, there may be a case where $N_C$ effective metrics stand in line continuously and (Nos/2) ineffective metrics stand in line on each side of the $N_C$ effective metrics.

Here, using j for indicating the imaginary unit and i for a suffix corresponding to a frequency slot for which metrics are obtained, each metric Zi is expressed as (ai+j bi), and as the result of the above-described descrete Fourier transform processing, two series of data {ai}, {bi} can be obtained indicating metrics {Zi} (i=1,2,3, . . . , $N_S$), the number of which is equal to the number Ns of sampling points.

For example, an OFDM signal in Mode I of EUREKA-147 DAB System has 1536 sub-carriers. For such a signal, the frequency control device 1000 of the present embodiment samples at 2048 (10th power of 2) sampling points, which exceeds the above number 1536 of sub-carriers, namely 1536. In this case, as shown in FIG. 3, there are obtained 1536 effective metrics and 512 ineffective metrics.

It is to be noted that, when the sampling number is increased by a power of 2, the speeding-up effect of DFT operation by FFT can be improved.

Next, in the frequency deviation detection section 1300, processing is carried out to determine a difference between the metrics distribution {ai+j bi} obtained in the discrete Fourier transform section 1200 and predetermined distribution, and an AFC signal is generated in accordance with the result of this processing.

As an example of the processing for obtaining the above-described difference, it is possible to use the metrics distribution {Zi} to obtain its power distribution {Pi}, and then to obtain a difference between a frequency corresponding to the center of this power distribution {Pi} and a predetermined reference frequency. The power P can be defined, for example, by the following equation:

$$P = Z2 \quad (101)$$
$$= Z \cdot Z^* = Z^* \cdot Z$$

where Z* is a complex conjugate of Z. Namely, when metric Z is written as:

$$Z=(a+j\ b)$$

the power of this metric can be given by the following equation:

$$P = (a + jb)(a - jb) \quad (102)$$
$$= (a \cdot a + b \cdot b)$$

Next, the processing carried out in the above-described frequency deviation detection section 1300 will be described in detail.

In this processing, there is obtained a window which has interval width of a frequency corresponding to continuously lined $N_C$ frequency slots and in which summation of power becomes a maximum for frequency slots included in this window. Then, a difference between the central frequency in the obtained window and the predetermined reference frequency is decided.

In the window whose lower end of the above-described interval is a k-th frequency slot, the summation M(k) of power in the frequency slots included in this window is summation of powers Pi in the frequency slots whose number is $N_C$ taking from the k-th frequency slot toward the higher frequency side, and can be written as:

$$M(k) = \sum_{i=k}^{k+NC} Pi = \sum_{i=k}^{k+NC} (Ai \cdot Ai + Bi \cdot Bi) \quad (2)$$

Here, windows are defined for intervals whose lower ends k vary from 1 to Nos.

Among the summations M(k) (k|1=<k=<Nos) as defined above, the maximum one is written as Mmax.

When, as described above, the interval width is $N_C$ frequency slots, or corresponds to the number of the effective metrics, the lower end giving the maximum value Mmax of the summations is decided uniquely and is written as K. Namely, the maximum summation can be written as Mmax(K).

Further, in the condition that no frequency difference exists, the frequency slots in which the effective metrics appear can be theoretically obtained. In this case, the number of the frequency slots is $N_C$, and the lower end slot is written as r-th slot. Namely, the effective metrics appear from r-th through (r+$N_C$)-th slots. In this case, for theoretical values of the metrics, the window in which summation of power becomes maximum for the frequency slots included has the lower end $K_T$=r. This correspond to the condition where the interval of the window coincides with the frequency range in which theoretically-obtained effective metric appears. For example, in the case of an OFDM signal in Mode I of EUREKA-147 DAB System, sampling at 2048 points results in r=256.

Based on the power summation of the metrics included in the window defined by the above-described calculation, a frequency difference is obtained between the received signal and theoretical frequency, i.e. sampling frequency. Namely, the frequency difference dF is proportional to a difference between the lower end r of the window which maximizes the theoretical metric and the lower end K of the window which maximizes the metric obtained from the received OFDM signal, and to the interval of the frequency slots, and can be written as:

$$dF \; S \cdot (r-K) \quad (103)$$

The above frequency difference dF can be obtained, for example, by the following equation:

$$dF = C \cdot P(r-k) \cdot \frac{M\max(K) - M(r)}{M\max(K)} \quad (3)$$

Here, C is a constant of proportionality, and the function P(r−k) is defined as follows:

$$P(r-k) = \begin{cases} +1, \ldots r > k \\ 0, \ldots r = k \\ -1, \ldots r < k \end{cases} \quad (4)$$

For example, when, for the window having the maximum power summation of the metrics obtained from the received OFDM signal, the lower end frequency slot K is larger than r, dF is negative. This means an upper shift (toward the higher frequency) of the frequency of the OFDM signal which is converted into the baseband in the quadrature detection section 1100 and is input into the discrete Fourier transform section 1200.

In the above-described processing procedure, the calculation has been carried out for all of $N_C$ effective metrics. However, it is possible to divide the window to have an upper end window and a lower end window, and to omit the calculation in the middle portion. This is because the effective metrics appear in a trapezoid shape, and in the middle portion, the window always overlaps the effective metrics, giving the same contribution to each window. By omitting the calculation in the middle portion, processing time can be shortened.

Namely, summation for each window can be calculated in accordance with the definition by the following equation:

$$M(k) = \sum_{i=k}^{k+n1} Pi + \sum_{i=k+Nc-n2}^{k+Nc} Pi \quad (5)$$

Here, the interval width of the omitted part is selected to be smaller than $N_C$, the number of the effective metric. The interval widths n1 and n2 of the two windows may be selected as the same or as different interval widths from each other. For example, the interval widths of the two windows may be selected to be the same in such a way that n1=n2=100, or n1=n2=200, or the like.

Further, when a received OFDM signal includes an interval in which power distribution is given in advance, the power distribution of the signal received in this interval and the above-described predetermined power distribution are compared with each other and such effects as frequency dependence of power transmission rate, background, or the like in the transmission path can be reduced. Further, it is possible to reduce the effects of circuits, such as an intermediate frequency amplifier, SAW filter, and the like, provided in the stages preceding the frequency control section.

As an example of the above-described interval in which power distribution is given in advance, it is possible to use a signal arriving in a null symbol duration in which null symbols, which do not include signals, are transmitted.

Namely, when metric obtained by carrying out the discrete Fourier transform on the above null symbols are expressed as:

Ci+j Di power summation for each window can be obtained by the following equation:

$$M(k) = \sum_{i=k}^{k=1535} \frac{(Ai \cdot Ai + Bi \cdot Bi)}{(Ci \cdot Ci + Di \cdot Di)} \quad (6)$$

This equation can be used either in the above-described calculation by single window or in the above-described calculation by two windows.

Next, referring to FIGS. 3 and 4, calculation procedure will be described.

First, in Step S10, for signals received in each symbol duration, discrete Fourier transform is performed using FFT.

Then, using metrics obtained as a result of the discrete Fourier transform, power summation is calculated for each window (S11). Among the obtained power summations, the maximum value is detected (S12).

Figure 3A:
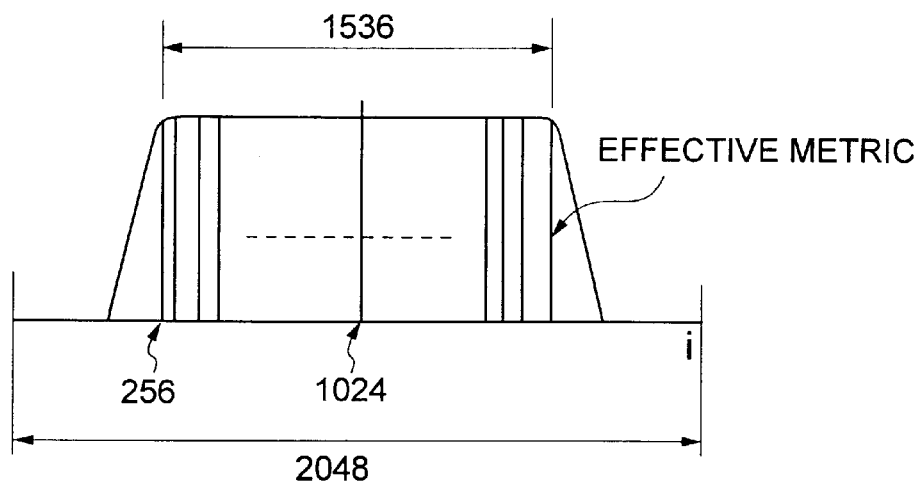
FIGS. 3A and 3B are explanatory views showing distribution of metrics.
Figure 3B:
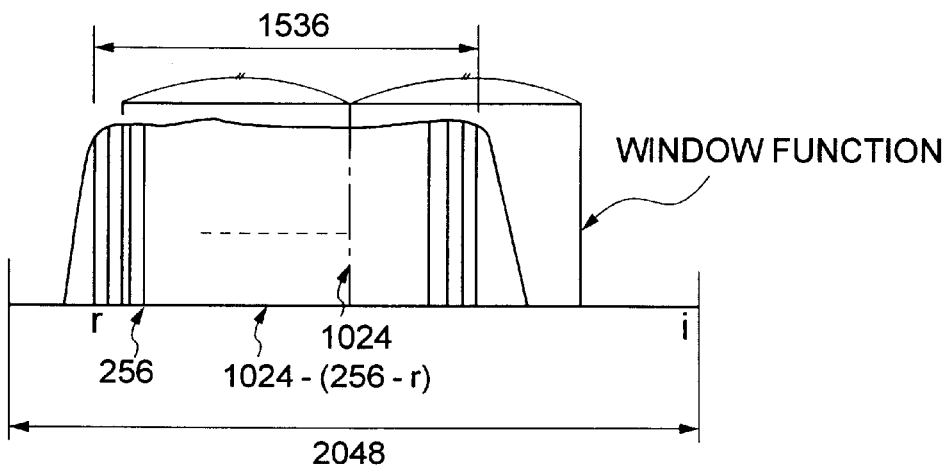
Figure 4:
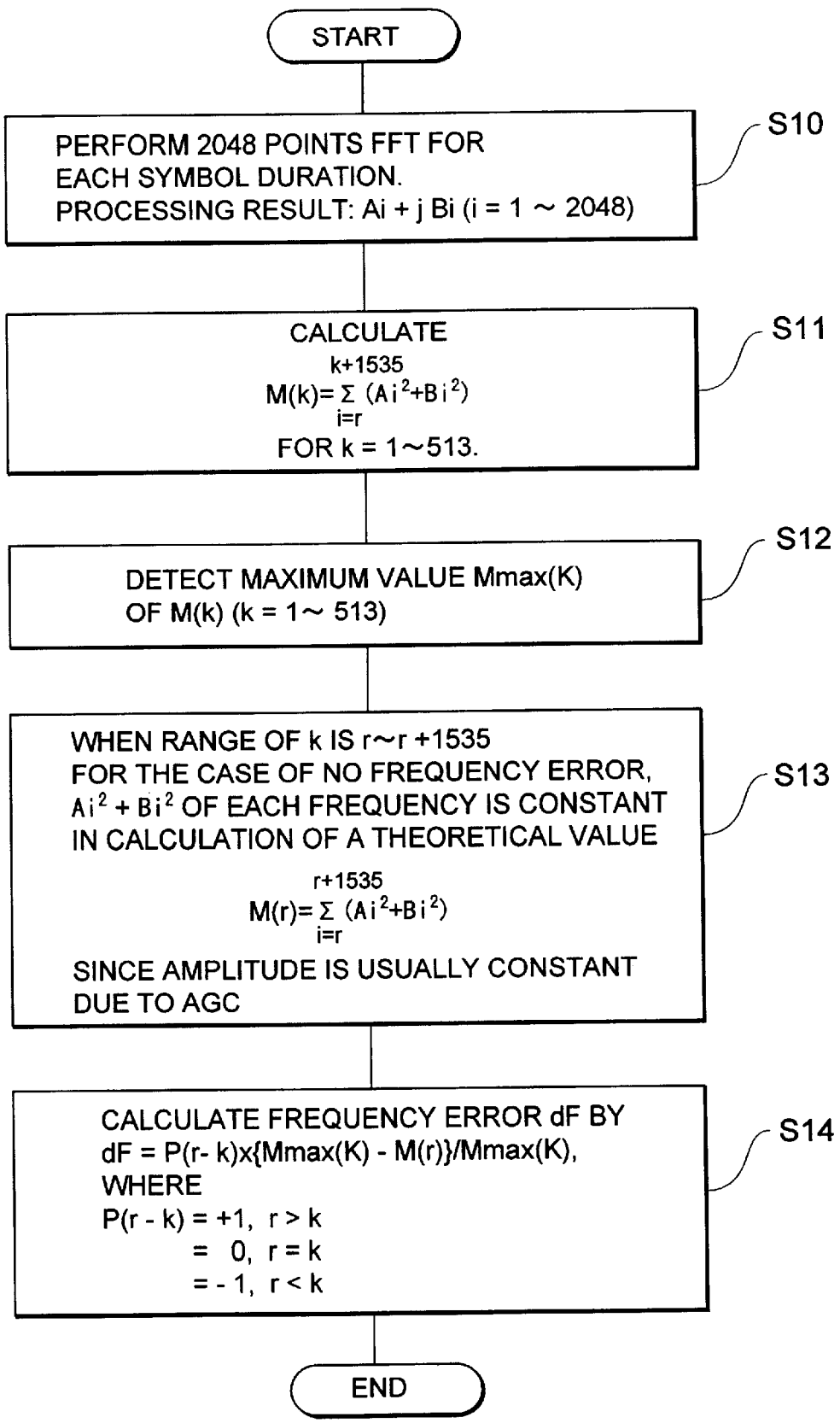
FIG. 4 is a flowchart showing an operational procedure in a first embodiment according to the present invention.

In Step S13, power summation is calculated for the theoretical metrics distribution, shown in FIG. 3A, obtained without frequency error.

Then, frequency error is obtained from the maximum value of the power summation determined in Step S12 and from the power summation for the theoretical metrics determined in Step S13 (S14).

The frequency synchronization is carried out by varying the frequencies of the reproduced carriers so as to decrease thus-obtained frequency error.

Next, a second embodiment of the p resent invention will be described.

The frequency control device 1000 (See FIG. 1) of the present embodiment is similar to the frequency control device of the first embodiment for the fundamental construction, but contents of operation in the processing section 1322 (See FIG. 1) are different. In the following, the main point s of difference are described.

In the present embodiment, a center of gravity is decided for the power distribution of metrics obtained from the received OFDM signal, and the frequency of this center of gravity and the above described reference frequency are compared. A frequency difference between the frequency of the center of gravity and the reference frequency is then decided, and to make this difference smaller, instructions to change the frequencies of the reproduced carriers are given to the quadrature detection section 1100 (See FIG. 1).

In the following, the processing carried out in the above-described processing section 1322 will be described in detail.

First, as for the distribution of $N_S$ metrics {Ai+j Bi} (i|1, 2, 3, . . . $N_S$) obtained in the discrete Fourier transform section 1200 (See FIG. 1), there are obtained power summation $W_L$ of metrics belonging to frequency slots (1–C) having lower frequencies than a frequency slot C corresponding to the predetermined reference frequency, and power summation $W_H$ of metrics belonging to frequency slots (C–$N_S$) having higher frequencies than that frequency slot C, respectively. As the reference frequency, it is possible to select, for example, a central frequency of power distribution of effective metric which are expected theoretically when a signal having the same frequency as the sampling frequency is received. In this case, the reference frequency is C=$N_S$/2.

The thus-obtained summation $W_L$ and summation $W_H$ are then compared, and a frequency difference is obtained from the difference δW between these summations. The difference δW between the summations may be calculated, for example, by the following equation:

$$\delta W = -W_L + W_H \quad (7)$$

$$= -\sum_{i=1}^{C} Pi + \sum_{i=C}^{Ns} Pi$$

In this equation, the central of gravity of the power distribution is obtained using all the metrics obtained. However, the calculation may be carried out for a theoretically-expected range of effective metric. Further, as for the reference frequency C, the same calculations are carried out repeatedly, and accordingly these calculations can be omitted from the description. Namely, as for the theoretically-expected reference frequency C, the difference of the summations can be obtained by the following equation:

$$\delta W = -\sum_{i=C-\frac{Nc}{2}}^{C-1} Pi + \sum_{i=C+1}^{C+\frac{Nc}{2}} Pi \quad (8)$$

When the calculation is carried out according to this equation, it is possible to calculate to which side the spectrum power distribution is biased with boundaries of C-th and (C+1)-th slots. The reference frequency C may be selected in accordance with theoretical setting of frequencies. For example, when the number of sampling points is 2048, C may be selected as follows:

$$C = 2048/2$$
$$= 1024$$

Further, similarly to the first embodiment, effects of the transmission line can be avoided by using a signal having known power distribution. Namely, from the metric {Ani+j Bni} for OFDM signal obtained in the null symbol duration and from the metric {Asi+j Bsi} for the signal symbol duration, metric to be used for the calculation are obtained as follows:

$$\{Ai + j\text{Bi}\} = \frac{\{Asi + j\text{Bsi}\}}{\{Ani + j\text{Bni}\}} \quad (9)$$

Further, it is possible to obtain the summation Wt of power of metrics for all the frequency slots, to standardize the above-described summation difference δW. Namely, the power summation Wt for all the frequency slots is obtained by the following equation:

$$Wt = \sum_{i=1}^{Ns} (Ai \cdot Ai + Bi \cdot Bi) \quad (10)$$

Using this Wt, it is possible to obtain the standardized summation difference δW/Wt. This is given to the control signal generating section 1350 (See FIG. 1) as a shift extent of frequency. Using this, even when the power of the received OFDM signal varies, that effect can be reduced.

Figure 5A:
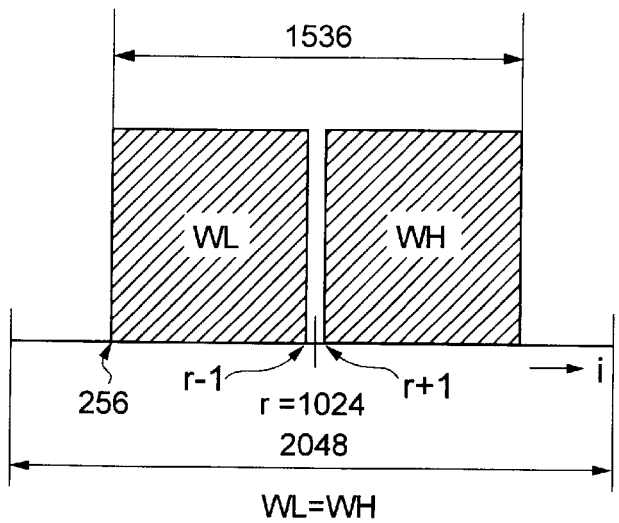
FIGS. 5A and 5B are explanatory views schematically showing power distribution of metrics divided into two areas.
Figure 5B:
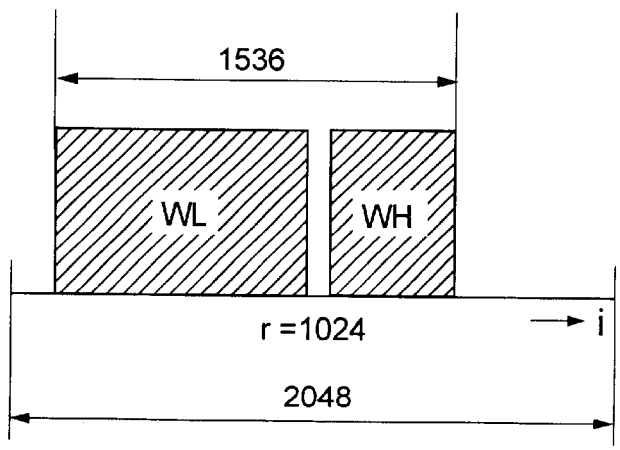
Figure 6:
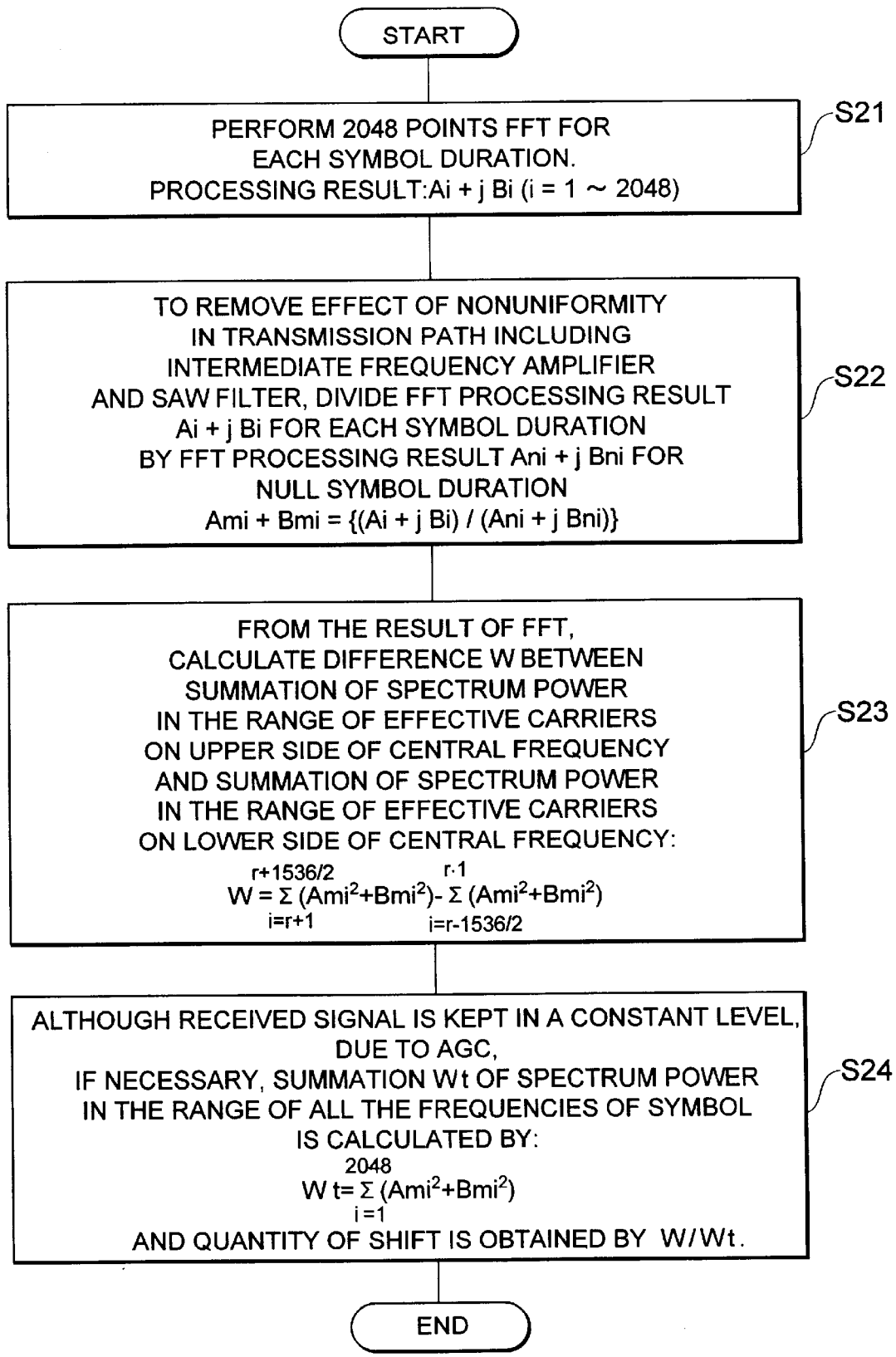
FIG. 6 is a flowchart showing an operational procedure in a second embodiment according to the present invention.

Next, referring to FIGS. 5 and 6, an example of the calculation procedure in the case of using the standardized metric will be described.

First, in Step S21, for a signal received in each symbol interval, the discrete Fourier transform is carried out using FFT.

The metric for the symbol duration is standardized by the metrics obtained from the null symbol duration (S22).

In Step S23, the metrics standardized in the above S22 is divided into two domains with respect to the boundary of the reference frequency, and power summation is calculated for each domain. At this time, when no frequency difference exists, two divided domains become symmetric as shown in FIG. 5A. When frequency difference does exist, for example, a receiving signal shifted to a lower frequency side, two domains become asymmetric as shown in FIG. 5B.

A difference between power summations in the above two domains is thus obtained.

In the case where the received signal is affected by fading or the like, the frequency shift is corrected in Step 24.

Next, referring to FIGS. 7 and 8, a third embodiment of the present invention will be described.

The frequency control device of the present embodiment is similar to the first embodiment for the fundamental construction, but contents of processing for obtaining the frequency difference are different. In the following, the main points of difference are described.

Figure 7A:
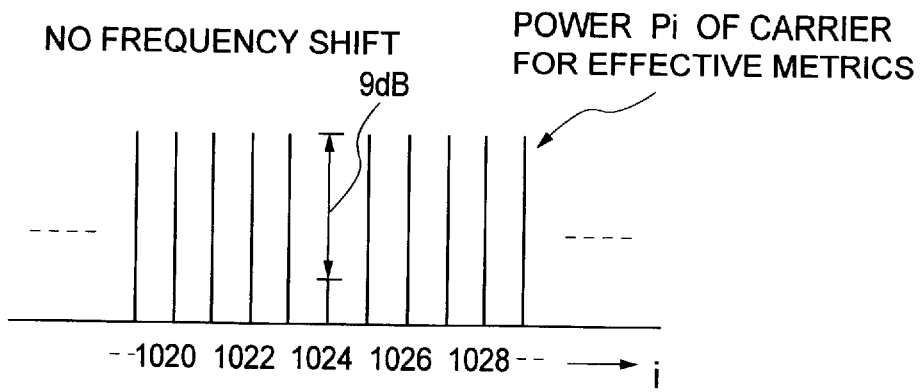
FIGS. 7A and 7B are explanatory views, each showing a central part of metrics distribution processed by DFT.
Figure 7B:
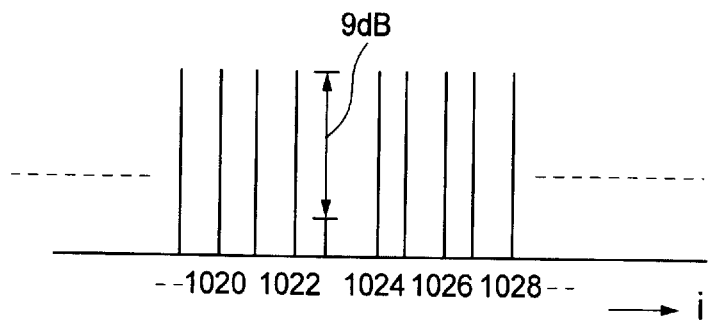

In the present embodiment, the frequency difference of a received OFDM signal is obtained by using the fact that metric power in the frequency slot of the central frequency is theoretically 0, as shown in FIG. 7A. Namely, when a frequency difference arises, the frequency slot for which power is 0 moves as shown in FIG. 7B. Accordingly, that frequency slot and the predetermined reference frequency are compared. In the following, this processing will be described in detail.

For each frequency slot i (i=1–$N_S$), power Pi of metric is:

$$Pi = (Ai \cdot Ai + Bi \cdot Bi) \quad (104)$$

For each frequency slot, there are defined a power ratio Rri of metrics in the frequency slot next on the higher frequency side, and a power ratio Rfi of metrics in the frequency slot next on the lower frequency side as follows:

$$Rfi = Pi/Pi-1 \quad (105a)$$

$$Rri = Pi/Pi+1 \quad (105b)$$

Then, such a frequency slot i is obtained that the above Rfi, Rri equal a predetermined Carrier to Noise ratio (C/N). This C/N ratio may be selected as 9 dB, for example. In that case, i is obtained such that the above Rfi and Rri are both equal to or less than 0.126. This i-th frequency slot is taken as the central frequency on the transmitting side, and compared with the frequency of the predetermined reference frequency slot, it is possible to obtain a frequency difference of the received signal.

In the case where the received OFDM signal includes a symbol duration with known power distribution, frequency-dependent effects in the transmission path can be reduced based on the power distribution of the signal in this duration. As characteristics having such dependence on frequency, it is possible to list characteristics of a transmission line connecting the transmitting and receiving sides, characteristics of space in which electromagnetic wave is propagated, characteristics of other circuits provided in stages preceding the frequency control device, and the like. As the above-described other circuit, it is possible to list an intermediate frequency amplifier, an SAW filter, and the like.

Further, as the above-described symbol duration with known power distribution, the null symbol duration may be used, for example. Namely, when the metric obtained by the discrete Fourier transform in the null symbol duration is written as:

$$\{Ani + j \, Bni\}$$

and the metric in the signal duration is written as:

$$\{Asi + j \, Bsi\},$$

then the metric standardized by the metric power in the null symbol duration can be obtained by the following equation:

$$\{Ai + j \, Bi\} = \{(Asi + j \, Bsi)/(Ani + j \, Bni)\} \quad (106)$$

By substituting this metrics into the power in the above-described calculation, it is possible to reduce the effects in the transmission line.

Further, the calculation may be carried out for all the metrics obtained by the discrete Fourier transform, i.e., for all the frequency slots corresponding to the sampling points. Alternatively, the calculation may be carried out using a predetermined number of metrics including the above-described reference frequency. This number of the metrics may be set in accordance with an expected maximum frequency difference. Such calculation with a part of the metrics can shorten the processing time.

Figure 8:
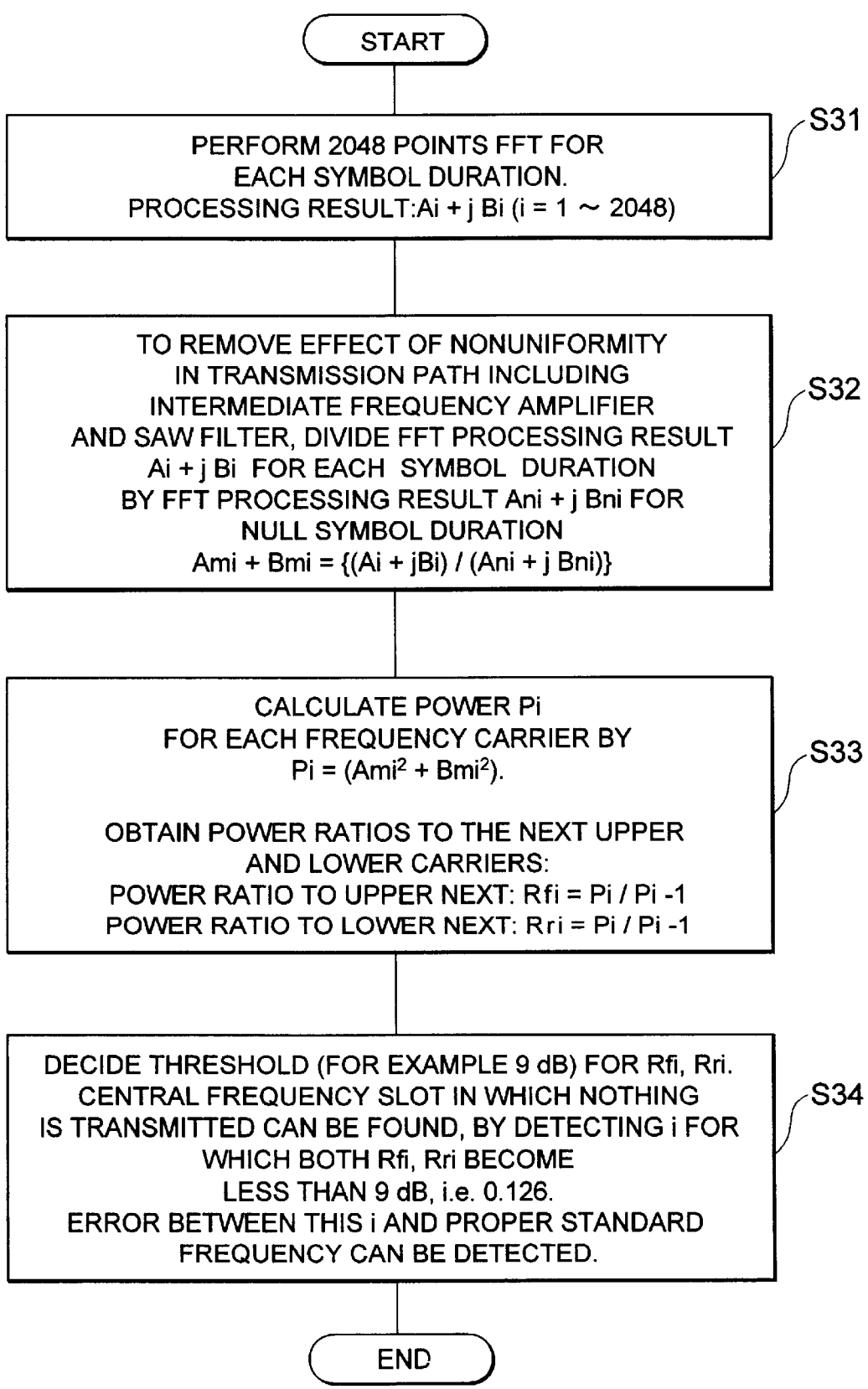
FIG. 8 is a flowchart showing an operational procedure in a third embodiment according to the present invention.

Referring to FIG. 8, calculation procedure of the processing with the standardized metric will be described.

First, for the symbol duration, metric obtained by sampling at 2048 sampling points and processing with FFT (S31) is received.

Next, metric obtained for the null symbol duration is received, and using this, the metric received in S31 is standardized (S32).

For each standardized metric, there are calculated power ratio s to metrics next on the higher frequency side and to metrics next on the lower frequency side (S33).

The power ratios for each frequency slot are compared with a predetermined threshold to obtain a frequency slot having both upper and lower power ratios are equal to or less than the threshold (S34).

Thus, the frequency slot having 0 power shown in FIG. 7 can be found (in fact, because of background such as noise, it is not absolutely 0). Th e frequency of this frequency slot and the reference frequency are then compared to detect frequency error.

According to the present embodiment, it is possible to use a frequency slot having minimum power in the central portion of the metric to detect frequency error, and to generate an AFC signal in accordance with this frequency error. As a result, it is possible to perform frequency synchronization even in the condition where there is a frequency error whose size is no less than half the sub-carrier interval.

Figure 10:
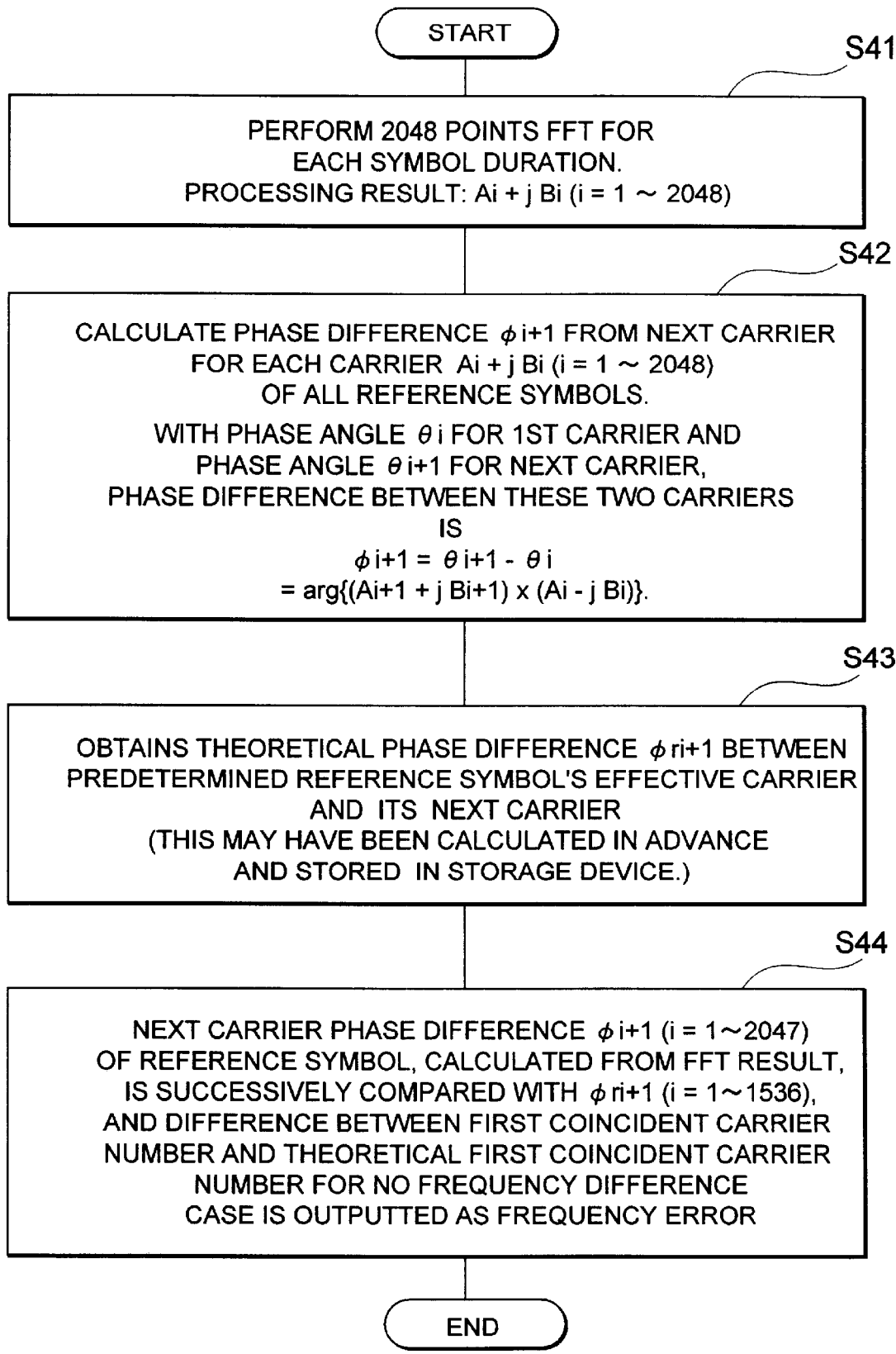
FIG. 10 is a flowchart showing an operational procedure in a fourth embodiment according to the present invention.

Next, referring to FIGS. 9 and 10, a fourth embodiment of the present invention will be described.

The frequency control device of the present embodiment is similar to the first embodiment with respect to the fundamental construction, but contents of processing for obtaining the frequency difference are different. In the following, main points of difference are described.

The processing of the present embodiment uses the fact that phase is specified in each metrics within a reference symbol transmitted directly after the null symbol. Namely, phases given by the metric obtained by the discrete Fourier transform of the reference symbol in the received OFDM signal and specified phase order on the transmitting side are compared, and from the difference in frequency slots, frequency difference for synchronous detection is detected.

For example, in the case of Mode I in EUREKA-147 DAB System, the number of sub-carriers is 1536 for the reference symbol duration too. Processing this by the discrete Fourier transform with the number of the sampling points being 2048, the same number (2048) of frequency slots are obtained (S41). Among these frequency slots, effective metrics are obtained for 1536 frequency slots. Writing the obtained metrics as:

$$\{Ai + j \, Bi\}$$

where, j is an imaginary number, and suffix i indicates i-th slot (i: 1–2048), a phase angle θi for each frequency slot component is written as:

$$\theta i = \arg(Ai + jBi) \quad (11)$$

This θi is astatic, i.e. it depends on sampling timing in an A/D converter employed for sampling, and on synchronous detection frequency. For this reason, the phase of any metrics includes stationary shift. Then, by writing phase difference between each frequency slot and its prior frequency slot as ψi+1, it can be obtained as follows (S42):

$$\psi i + 1 = \theta_{i+1} - \theta i \quad (12)$$
$$= \arg\{(Ai + 1 + jBi + 1)(Ai - jBi)\}$$

On the other hand, the reference symbol in Mode I of EUREKA-147 DAB System is transmitted with contents of θri as shown in FIG. 9. Phase difference ψri+1 from the prior one is similarly obtained, and can be listed as shown in FIG. 9. Here, FIG. 9 shows phase differences for sixteen frequency slots extracted on the higher frequency side from the frequency slots of the reference frequency among metrics of 1536 sub-carriers received.

Accordingly, it can be said that, on comparing the list of phase differences ψi+1 of the metrics obtained from the received OFDM signal with ψri+1 on the transmitting side, a coincident frequency slot is the correct one. At this point, frequency difference for synchronous detection can be detected as deviation whose size is an integer multiple of the sub-carrier interval (S44).

Further, comparison of the list of phases may be performed for all 1536 sub-carriers or for just some of them. When comparison is made for some of the sub-carriers, calculation time can be shortened.

According to the present embodiment, in the case where a signal interval exists for which a list of phases for respective sub-carriers is known in advance, this list of phases can be compared with the list of phases for the received signal, to obtain a frequency difference of the received signal.

Next, referring to FIG. 11, a fifth embodiment of the present invention will be described. The present embodiment relates to an OFDM receiving device which performs frequency synchronization, utilizing the processing described in the first through fourth embodiments.

Figure 11:
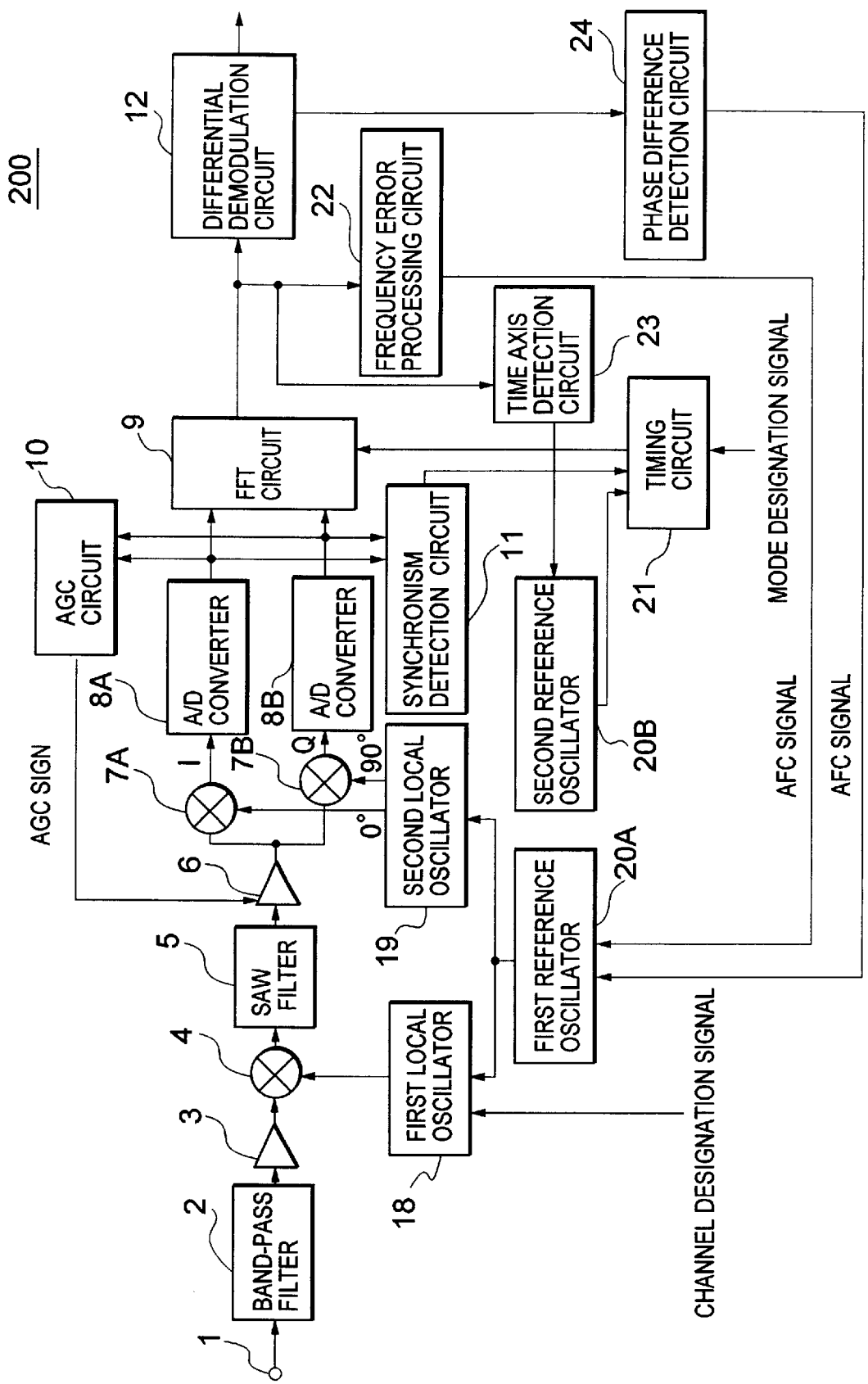
FIG. 11 is a block diagram showing a receiving device according to the present invention.

As shown in FIG. 11, the receiving device 200 comprises an input terminal 1, a band-pass filter 2, an amplifier 3, a multiplier 4, an SAW filter 5, an intermediate frequency amplifier 6, multipliers 7A, 7B, A/D converters 8A, 8B, FFT circuit 9, AGC circuit 10, synchronism detection circuit 11, differential demodulation circuit 12, a first local oscillator 18, a second local oscillator 19, a first reference oscillator 20A, a second reference oscillator 20B, timing circuit 21, frequency error processing circuit 22, time axis detection circuit 23, and phase error detection circuit 24. The multipliers 7A, 7B and the second local oscillator 19 constitute a quadrature detection circuit.

In the above-described receiving device 200, an RF signal applied to the input terminal 1 has noise outside the predetermined band removed through the band-pass filter 2, and is then amplified by the amplifier 3, and multiplied by a local oscillation signal from the first local oscillator 18 at the multiplier 4, to be converted to an intermediate frequency signal. The converted intermediate frequency signal is limited in its band width by the SAW filter 5, and after being amplified to a given level by the intermediate frequency amplifier 6, is led through two routes to the respective multipliers 7A, 7B.

The multipliers 7A, 7B respectively receive two-phase local oscillation signals with a phase difference of 90° between each other, from the second local oscillator 19, and respectively multiply them by the intermediate frequency signal as another input, thus constituting the quadrature detection circuit. Outputs of the multipliers 7A, 7B are converted to digital data through A/D converters 8A, 8B respectively, and the FFT circuit 9 removes guard intervals from those digital data and takes in significant data intervals, to perform FFT processing.

After the FFT processing, the data is differentially demodulated, and finally converted into a voice signal. Detailed description of this processing is omitted here.

On the other hand, metrics of output of the FFT circuit 9 is inputted into the frequency error processing circuit 22, which performs the above-described processing and supplies a frequency difference component to the first reference oscillator 20A as an AFC signal. On the other hand, an output signal from the differential demodulation circuit 12 is inputted into the phase error detection circuit 24, which detects phase error and, based on that error, also supplies the AFC signal for control within $\pm(\frac{1}{2})$ of the sub-carrier interval to the first reference oscillator 20A.

According to the present embodiment, even when a frequency error with a size of more than half the sub-carrier interval arises, frequency synchronization can be performed. This receiving device 200 can be used, for example, for receiving digital voice broadcasting in EUREKA-147 DAB System.

Next, referring to FIG. 12, a sixth embodiment of the present invention will be described. The present embodiment relates to an example of a communication device used for communication with OFDM signal.

Figure 12:
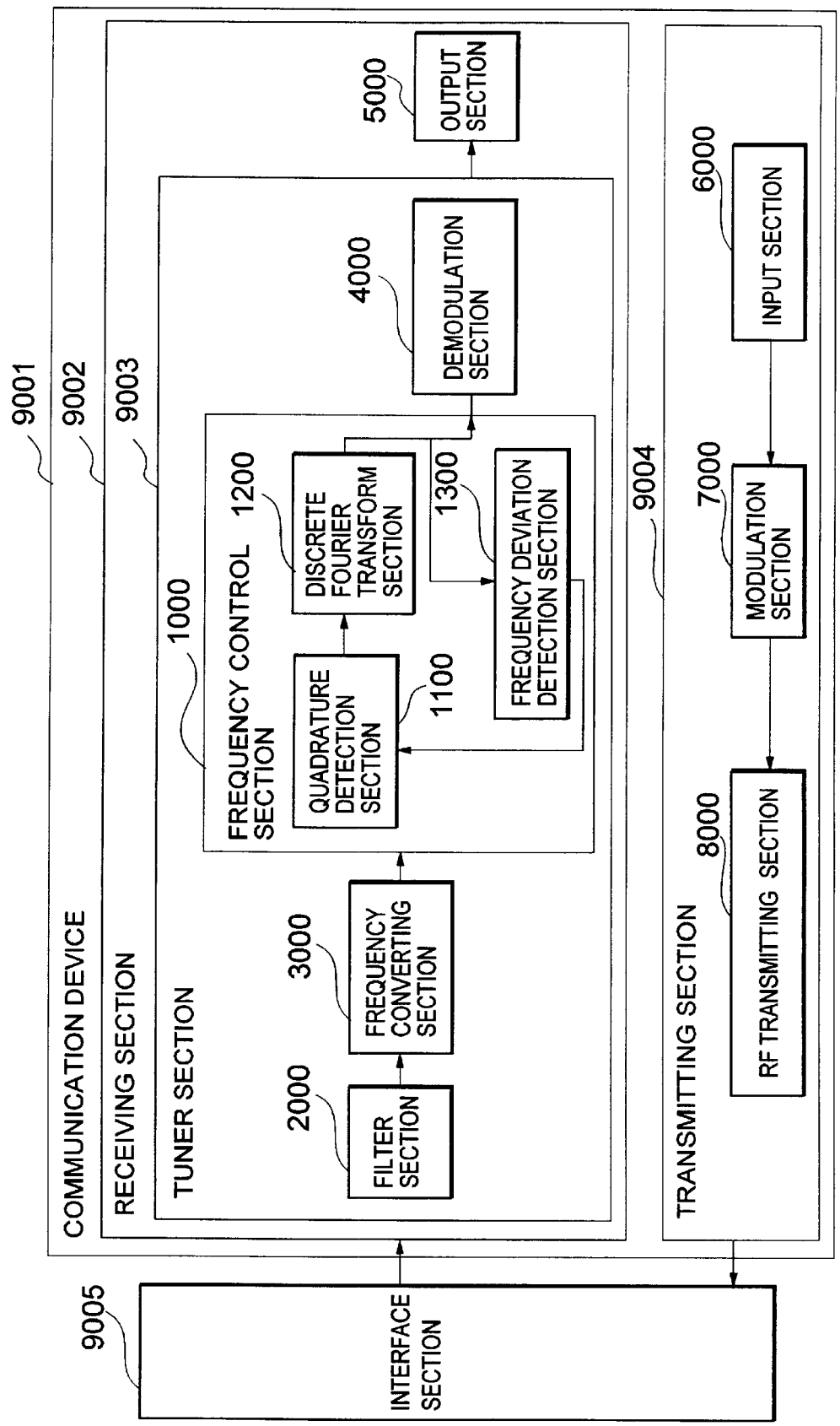
FIG. 12 is a block diagram showing a communication device according to the present invention.

In FIG. 12, a communication device 9001 comprises a receiving section 9002 for reception of an arriving OFDM signal and for outputting information indicated by the OFDM signal, and a transmitting section 9004 for receiving information to be transmitted and for transmitting this information as OFDM signal.

The receiving section 9002 comprises a filter section 2000 for selecting signal in predetermined band from arriving electromagnetic wave, a frequency converting section 3000 for converting frequency of the signal in the selected band to intermediate frequency, a frequency control section 1000 for detection and frequency synchronization, a demodulation section 4000 for demodulating the detected signal, and an output section 5000 for outputting information indicated by the demodulated signal.

The frequency control section 1000 may be constituted similarly to the frequency control devices of the above-described first through fourth embodiments. For example, the frequency control section 1000 may comprise a quadrature detection section 1100 for obtaining an in-phase detection axis signal (I-phase axis signal) and a quadrature detection axis signal (Q-phase axis signal), a discrete Fourier transform section 1200 for performing the discrete Fourier transform on the I-phase signal and Q-phase signal, and a frequency deviation detection section 1300 for detecting frequency deviation using the signal processed with the discrete Fourier transform.

As the output section 5000, there are listed a voice output device for outputting voice information, an image output device for displaying image, a data output device for outputting data, and the like.

The voice output device may be constructed using, for example, an amplifier, a loud speaker, and the like.

The image output device may be constructed using, for example, an image display circuit and a display unit.

The data output device may be constructed using, for example, an interface circuit, buffer circuit, signal conversion circuit, and the like.

In the receiving section 9002, the filter section 2000, the frequency converting section 3000, the frequency control section 1000 and the demodulation section 4000 may be constituted together within a box which is called a tuner section 9003. As a result, in accordance with an information output mode, combination of output devices can be changed, or it is possible to cope with various tastes in quality of information displaying.

The transmitting section 9004 comprises an input section 6000 for receiving information and converting it to a signal, a modulation section 7000 for modulating a carrier with the converted signal, and an RF transmitting section 8000 for transmitting the modulated carrier.

Further, the communication device 9001 communicates with other devices connected to an interface section 9005 for transmitting and receiving an OFDM signal. The interface section 9005 may use, for example, an antenna, a photoelectric converter, an electric signal connector, and the like, depending on the connection mode of the communication device 9001, for example. Further, the interface section 9005 may be provided outside the communication device 9001 as in the shown example, or may be built-in within the communication device 9001.

According to the present embodiment, even in the condition where a frequency difference is generated between the transmitting side and the receiving side, it is possible to communicate, by frequency synchronization.

As described above, the present invention provides a frequency control device which can perform frequency synchronization even when a frequency difference arises in the synchronous detection frequency for demodulating a received OFDM signal that is of such a degree that the size of the frequency difference is several times as large as the frequency interval of the multiplex carriers obtained by the discrete Fourier transform of the received signal.

As a result, even if there is a shift of reference frequencies between the transmitting and receiving sides, it is possible to transmit information. Further, there is provided a frequency control device which can perform frequency synchronization even when Doppler shift arises due to relative movements of transmitting and receiving sides.

Further, it is possible to construct a receiving device mounted with the above-described frequency control device, and this receiving device can stably receive broadcasting using an OFDM signal. An example of such broadcasting is one using EUREKA-145 System DAB.

Further, it is possible to construct a communication device mounted with the above-described frequency control device. As a result, it is possible to stabilize frequency synchronization in a digital telephone or the like. Application of the OFDM system becomes easier, and accordingly, it is possible to cope with communication in which large information is transmitted, such as communication by TV phone using a large amount of signals including image signals. Further, frequency synchronization is possible even with a larger frequency difference, and accordingly, control of a reference frequency becomes easier in each device. Further, even in the case where a frequency difference arises due to Doppler shift in communication caused by a moving object, it is possible to ensure communication in which frequency synchronization is maintained.

What is claimed is:

1. A frequency control device for frequency synchronization with a multiplex signal produced by orthogonal frequency division multiplexing into a plurality of sub-carriers, comprising:

quadrature detection means for performing quadrature detection on said multiplex signal to obtain a first detection axis signal and a second detection axis signal, which are quadrate to each other;

discrete Fourier transform means for obtaining a plurality of metrics distributed in a frequency domain, by sampling respective time axis waveforms of said two detection axis signals at a predetermined sampling frequency, and by performing a discrete Fourier transform on thus-sampled data;

operation control means for generating frequency change instructions in accordance with a difference between a distribution of the metrics obtained by said discrete Fourier transform means and a predetermined distribution of metrics; and frequency changing means for changing a frequency of a signal inputted into said discrete Fourier transform means in accordance with said instructions generated by said operation control means.

2. The frequency control device according to claim 1, wherein:

said frequency changing means changes the frequency of the signal inputted into said discrete Fourier transform means, by changing frequencies of reproduced carriers used for quadrature detection in said quadrature detection means.

3. The frequency control device according to claim 1, wherein:

frequency converting means, for converting the frequency of the multiplex signal inputted into said quadrature detection means, is provided in a preceding stage of said frequency control device; and said frequency changing means changes conversion quantity by which said frequency converting means is to convert the frequency, so as to change the frequency of the signal inputted into said discrete Fourier transform means.

4. The frequency control device according to claim 1, wherein:

said discrete Fourier transform means performs sampling of each of said two detection axis signals at sampling points whose number is more than a number of said multiplexed sub-carriers.

5. The frequency control device according to claim 1, wherein:

said discrete Fourier transform means performs said sampling, for intervals including an interval corresponding to one interval of a carrier frequency of lowest order sub-carrier out of said plurality of sub-carriers.

6. The frequency control device according to claim 1, wherein:

said operation control means obtains a power spectrum based on the distribution of the metrics obtained by said discrete Fourier transform means; and gives instructions to said frequency changing means to change the frequency so that a center of a distribution of said power spectrum approaches a predetermined reference frequency.

7. The frequency control device according to claim 1, wherein:

said operation control means obtains a power spectrum based on the distribution of the metrics obtained by said discrete Fourier transform means; and gives instructions to said frequency changing means to change the frequency so that said power spectrum becomes symmetric distribution with respect to a predetermined reference frequency.

8. The frequency control device according to claim 1, wherein:

said operation control means obtains power of each metric obtained by said discrete Fourier transform means, and gives instructions to said frequency changing means to change the frequency so that a product of said power of each metric and a window function predetermined for the frequency domain becomes maximum.

9. A frequency control device for frequency synchronization with a multiplex signal produced by orthogonal frequency division multiplexing into a plurality of sub-carriers, comprising:

quadrature detection means for performing quadrature detection on said multiplex signal to obtain a first detection axis signal and a second detection axis signal, which are quadrate to each other;

discrete Fourier transform means for obtaining a plurality of metrics distributed in a frequency domain, by sampling respective time axis waveforms of said two detection axis signals at a predetermined sampling frequency, and by performing discrete Fourier transform on thus-sampled data;

operation control means for obtaining summation of power of metric in each of a plurality of addition intervals, each having the same interval width, and for generating frequency change instructions to change the frequency so that, as for an additional interval whose summation of said power is maximum among said plurality of addition intervals, a frequency at a center of the interval approaches a predetermined reference frequency; and frequency changing means for changing frequency of a signal inputted into said discrete Fourier transform means in accordance with said instructions generated by said operation control means.

10. The frequency control device according to claim 9, wherein:

said interval width corresponds to frequency width in which frequency slots are lined continuously by the number of said sub-carriers into which the signal is multiplexed.

11. A frequency control device for frequency synchronization with a multiplex signal produced by orthogonal frequency division multiplexing into a plurality of sub-carriers, comprising:

quadrature detection means for performing quadrature detection on said multiplex signal to obtain a first detection axis signal and a second detection axis signal, which are quadrate to each other;

discrete Fourier transform means for obtaining a plurality of metrics distributed in a frequency domain, by sampling respective time axis waveforms of said two detection axis signals at a predetermined sampling frequency, and by performing discrete Fourier transform on thus-sampled data;

operation control means for obtaining a difference between summation of power for metrics, each having higher frequency than a predetermined reference frequency and summation of power for metrics, each having lower frequency than said reference frequency, and for generating frequency change instructions to change the frequency so that said difference obtained becomes smaller; and frequency changing means for changing frequency of a signal inputted into said discrete Fourier transform means in accordance with said instructions generated by said operation control means.

12. A frequency control device for frequency synchronization with a multiplex signal produced by orthogonal frequency division multiplexing into a plurality of sub-carriers, comprising:

quadrature detection means for performing quadrature detection on said multiplex signal to obtain a first detection axis signal and a second detection axis signal, which are quadrate to each other;

discrete Fourier transform means for obtaining a plurality of metrics distributed in a frequency domain, by sampling respective time axis waveforms of said two detection axis signals at a predetermined sampling frequency, and by performing discrete Fourier transform on thus-sampled data;

operation control means for obtaining, for each metric obtained by said discrete Fourier transform means, a first power ratio to lower metric having a frequency lower by predetermined frequency and a second power ratio to upper metric having a frequency higher by a predetermined frequency, and for generating frequency change instructions to change the frequency so that frequency of metric whose said first power ratio and said second power ratio are both less than a predetermined power ratio approaches a predetermined reference frequency; and frequency changing means for changing frequency of a signal inputted into said discrete Fourier transform means in accordance with said instructions generated by said operation control means.

13. A frequency control device for frequency synchronization with a multiplex signal, which is produced by orthogonal frequency division multiplexing into a plurality of sub-carriers and has a reference symbol duration for transmitting a reference phase used in differential demodulation of each sub-carrier, comprising:

quadrature detection means for performing quadrature detection on said multiplex signal using reproduced carriers, to obtain a first detection axis signal and a second detection axis signal, which are quadrate to each other;

discrete Fourier transform means for obtaining a plurality of metrics distributed in a frequency domain, by sampling respective time axis waveforms of said two detection axis signals at a predetermined sampling frequency, and by performing a discrete Fourier transform on thus-sampled data;

operation control means for generating frequency change instructions in accordance with a difference between a series of phases of the metrics obtained by said discrete Fourier transform means and a predetermined series of phases; and frequency changing means for changing a frequency of a signal inputted into said discrete Fourier transform means in accordance with the instructions generated by said operation control means, and said operation control means stores in advance, for at least some sub-carriers out of said plurality of sub-carriers, a series of phase differences indicating a phase difference between a reference phase of each sub-carrier and a reference phase of a next sub-carrier, and, when the multiplex signal is received in the reference symbol duration, obtains, for metrics in the reference symbol duration, phase differences between each metric and respective next metric, and gives instructions to said frequency changing means to change the frequency so that said series of phases stored in advance coincides with at least a part of a series of said phase differences obtained.

14. A receiving device for receiving a multiplex signal produced by orthogonal frequency division multiplexing, comprising:

a band-pass filter section for receiving a high frequency signal containing the multiplex signal, and for selecting a part in a predetermined frequency band from the received high frequency signal;

a frequency control section for quadrature detection of said selected signal using reproduced carriers, for performing discrete Fourier transform on the detected signal, and for controlling frequencies of said reproduced carriers to perform frequency synchronization;

a demodulation section for demodulating said signal processed by the discrete Fourier transform; and an output section for outputting said demodulated signal, and said frequency control section comprises:

quadrature detection means for performing quadrature detection on the multiplex signal to obtain a first detection axis signal and a second detection axis signal, which are quadrate to each other;

discrete Fourier transform means for obtaining a plurality of metrics distributed in a frequency domain, by sampling respective time axis waveforms of said two detection axis signals at a predetermined sampling frequency, and by performing discrete Fourier transform on thus-sampled data;

operation control means for generating frequency change instructions in accordance with a difference between distribution of the metrics obtained by said discrete Fourier transform means and a predetermined distribution of metrics; and frequency changing means for changing frequency of a signal inputted into said discrete Fourier transform means in accordance with said instructions generated by said operation control means.

15. A communication device for communication using a multiplex signal produced by orthogonal frequency division multiplexing, comprising:

a transmitting section for performing orthogonal frequency division multiplexing modulation on a carrier, using data indicated by an inputted signal, and for transmitting the multiplex signal obtained; and a receiving section for detecting modulated data, by performing orthogonal frequency division multiplexing demodulation on a received signal, and for outputting a signal indicated by the modulated data; and said receiving section comprises:

a band-pass filter section for receiving a high frequency signal containing the multiplex signal, and for selecting a part in a predetermined frequency band from the received high frequency signal;

a frequency control section for quadrature detection of said selected signal using reproduced carriers, for performing discrete Fourier transform on the detected signal, and for controlling frequencies of said reproduced carriers to perform frequency synchronization;

a demodulation section for demodulating said signal processed by the discrete Fourier transform; and an output section for outputting said demodulated signal, and said frequency control section comprises:

quadrature detection means for performing quadrature detection on the multiplex signal to obtain a first detection axis signal and a second detection axis signal, which are quadrate to each other;

discrete Fourier transform means for obtaining a plurality of metrics distributed in a frequency domain, by sampling respective time axis waveforms of said two detection axis signals at a predetermined sampling frequency, and by performing discrete Fourier transform on thus-sampled data;

operation control means for generating frequency change instructions in accordance with a difference between distribution of the metrics obtained by said discrete Fourier transform means and a predetermined distribution of metrics; and frequency changing means for changing frequency of a signal inputted into said discrete Fourier transform means in accordance with said instructions generated by said operation control means.

16. A receiving device for receiving a multiplex signal produced by orthogonal frequency division multiplexing, comprising:

a band-pass filter section for receiving a high frequency signal containing the multiplex signal, and for selecting a part in a predetermined frequency band from the received high frequency signal;

a frequency control section for quadrature detection of said selected signal using reproduced carriers, for performing discrete Fourier transform on the detected signal, and for controlling frequencies of said reproduced carriers to perform frequency synchronization;

a demodulation section for demodulating said signal processed by the discrete Fourier transform; and an output section for outputting said demodulated signal, and said frequency control section comprises:

quadrature detection means for performing quadrature detection on the multiplex signal using reproduced carriers, to obtain a first detection axis signal and a second detection axis signal, which are quadrate to each other;

discrete Fourier transform means for obtaining a plurality of metrics distributed in a frequency domain, by sampling respective time axis waveforms of said two detection axis signals at a predetermined sampling frequency, and by performing discrete Fourier transform on thus-sampled data;

operation control means for generating frequency change instructions in accordance with a difference between a series of phases of the metrics obtained by said discrete Fourier transform means and a predetermined series of phases; and frequency changing means for changing a frequency of a signal inputted into said discrete Fourier transform means in accordance with the instructions generated by said operation control means, and said operation control means
stores in advance, for at least some sub-carriers out of said plurality of sub-carriers, a series of phase differences indicating a phase difference between a reference phase of each sub-carrier and a reference phase of a next sub-carrier, and,
when the multiplex signal is received in the reference symbol duration,
obtains, for metrics in the reference symbol duration, phase differences between each metric and a respective next metric, and
gives instructions to said frequency changing means to change the frequency so that said series of phases stored in advance coincides with at least a part of a series of said phase differences obtained.

17. A communication device for communication using a multiplex signal produced by orthogonal frequency division multiplexing, comprising:

a transmitting section for performing orthogonal frequency division multiplexing modulation on a carrier, using data indicated by an inputted signal, and for transmitting the multiplex signal obtained; and a receiving section for detecting modulated data, by performing orthogonal frequency division multiplexing demodulation on a received signal, and for outputting a signal indicated by the modulated data; and said receiving section comprises:
a band-pass filter section for receiving a high frequency signal containing the multiplex signal, and for selecting a part in a predetermined frequency band from the received high frequency signal;

a frequency control section for quadrature detection of said selected signal using reproduced carriers, for performing discrete Fourier transform on the detected signal, and for controlling frequencies of said reproduced carriers to perform frequency synchronization;

a demodulation section for demodulating said signal processed by the discrete Fourier transform; and an output section for outputting said demodulated signal, and said frequency control section comprises:
quadrature detection means for performing quadrature detection on the multiplex signal using reproduced carriers, to obtain a first detection axis signal and a second detection axis signal, which are quadrate to each other;

discrete Fourier transform means for obtaining a plurality of metrics distributed in a frequency domain, by sampling respective time axis waveforms of said two detection axis signals at a predetermined sampling frequency, and by performing discrete Fourier transform on thus-sampled data;

operation control means for generating frequency change instructions in accordance with a difference between a series of phases of the metrics obtained by said discrete Fourier transform means and a predetermined series of phases; and frequency changing means for changing a frequency of a signal inputted into said discrete Fourier transform means in accordance with the instructions generated by said operation control means, and said operation control means
stores in advance, for at least some sub-carriers out of said plurality of sub-carriers, a series of phase differences indicating a phase difference between a reference phase of each sub-carrier and a reference phase of a next sub-carrier, and,
when the multiplex signal is received in the reference symbol duration,
obtains, for metrics in the reference symbol duration, phase differences between each metric and a respective next metric, and
gives instructions to said frequency changing means to change the frequency so that said series of phases stored in advance coincides with at least a part of a series of said phase differences obtained.

18. A frequency control device for frequency synchronization with a multiplex signal produced by orthogonal frequency division multiplexing into a plurality of sub-carriers, comprising:

transform means for transforming time axis waveforms of received multiplex signal into a frequency domain;

comparing means for comparing a frequency of a center of a spectral distribution obtained by said transformation into the frequency domain with a predetermined reference frequency; and changing means for changing frequency of the multiplex signal before being inputted into said transform means so that a difference between the frequency of the center of said spectral distribution and said reference frequency becomes smaller.

19. A method of frequency control for frequency synchronization with multiplex signal produced by orthogonal frequency division multiplexing into a plurality of sub-carriers, comprising the steps of:

transforming time axis waveforms of received multiplex signal into a frequency domain;

comparing a frequency of a center of a spectral distribution obtained by said transformation into the frequency domain with a predetermined reference frequency; and changing a frequency of the multiplex signal before being inputted into said transform means so that a difference between the frequency of the center of said spectral distribution and said reference frequency becomes smaller.

* * * * *